US007698314B2

(12) United States Patent
Croft et al.

(10) Patent No.: US 7,698,314 B2
(45) Date of Patent: Apr. 13, 2010

(54) COMPUTER-IMPLEMENTED SYSTEMS AND METHODS FOR PROVIDING A COUNTING MEASURE

(75) Inventors: Karen E. Croft, Cary, NC (US); Janet Tierney, Cary, NC (US)

(73) Assignee: SAS Institute Inc., Cary, NC (US)

( * ) Notice: Subject to any disclaimer, the term of this patent is extended or adjusted under 35 U.S.C. 154(b) by 561 days.

(21) Appl. No.: 11/270,408

(22) Filed: Nov. 9, 2005

(65) Prior Publication Data

US 2007/0106643 A1 May 10, 2007

(51) Int. Cl.
*G06F 7/00* (2006.01)
*G06F 17/00* (2006.01)

(52) U.S. Cl. ..................................... 707/607
(58) Field of Classification Search ............. 707/1, 707/3
See application file for complete search history.

(56) References Cited

U.S. PATENT DOCUMENTS

| | | | | |
|---|---|---|---|---|
| 5,918,225 | A * | 6/1999 | White et al. | 707/3 |
| 6,735,587 | B2 * | 5/2004 | Colby et al. | 707/4 |
| 6,775,682 | B1 * | 8/2004 | Ballamkonda et al. | 707/102 |
| 2004/0193626 | A1 | 9/2004 | Colby et al. | |
| 2005/0138001 | A1 * | 6/2005 | Mittal et al. | 707/2 |
| 2005/0177553 | A1 * | 8/2005 | Berger et al. | 707/3 |
| 2006/0085592 | A1 * | 4/2006 | Ganguly et al. | 711/114 |
| 2007/0239663 | A1 * | 10/2007 | Dyskant | 707/2 |

OTHER PUBLICATIONS

Netz Amir, "Analysis Services: Distinct Count, Basket Analysis and Solving the Multiple Selection of Members Problem"<pp. 1-7.*

SAS, SAS 9.1 OLAP Server, published Jan. 1, 2004.*

William Pearson, MDX Analysis Services, Published Dec. 12, 2002, pp. 1-15.*

Netz, Amir, "Analysis Services: DISTINCT COUNT, Basket Analysis, and Solving the Multiple Selection of Members Problem", http://msdn.microsoft.com/sql/default.aspx?pull=/library/en-us/dnsql2k/html/distinct2.asp&print=true (7 pp.).

Pearson, III, William E., "Optimizing Microsoft SQL Server Analysis Services: MDX Optimization Techniques: Considering DISTINCT COUNT", SQL-Server-Performance.Com, Part 10 of a Series, Oct. 16, 2004 (15 pp.).

Pearson, III, William E., "Optimizing Microsoft SQL Server Analysis Services: MDX Optimization Techniques: Segregating DISTINCT COUNT", SQL-Server-Performance.Com, Part 11 of a Series, Nov. 6, 2004 (25 pp.).

* cited by examiner

*Primary Examiner*—James Trujillo
*Assistant Examiner*—Jeffrey Burke
(74) *Attorney, Agent, or Firm*—Jones Day

(57) ABSTRACT

In accordance with the teachings described herein, systems and methods are provided for calculating a distinct count value from data stored in a hierarchical database. A counting measure may be defined in the hierarchical database such that the counting measure is associated with members of a first category of data to be stored in the hierarchical database. A query may be received that identifies the counting measure. The hierarchical database may be queried to identify members of the first category of data that are presently in the hierarchical database. A data structure may be generated that includes the members of the first category of data that are stored in the hierarchical database. One or more distinct count values may be calculated for the members of the first category of data that are stored in the hierarchical database.

25 Claims, 31 Drawing Sheets

| DEALER | DESTINATION | DATE | CAR | COLOR | SALES |
|---|---|---|---|---|---|
| FINCH | AL | MARCH | FORD | BLUE | 10000 |
| FINCH | CT | FEBRUARY | CHRYSLER | GREEN | 20000 |
| FINCH | CT | FEBRUARY | TOYOTA | RED | 15000 |
| FINCH | NC | JANUARY | CHRYSLER | BLUE | 20000 |
| FINCH | NC | JANUARY | FORD | BLUE | 10000 |
| FINCH | SC | APRIL | CHEVY | WHITE | 10000 |
| FINCH | SC | MAY | FORD | BLACK | 10000 |
| JONES | FL | JANUARY | TOYOTA | BLACK | 4000 |
| JONES | NC | JANUARY | TOYOTA | GREEN | 10000 |
| JONES | NC | FEBRUARY | TOYOTA | RED | 4000 |
| JONES | NC | MAY | TOYOTA | GREEN | 4000 |
| JONES | NC | MAY | TOYOTA | RED | 4000 |
| SMITH | CA | APRIL | FORD | BLUE | 12000 |
| SMITH | CT | FEBRUARY | TOYOTA | RED | 15000 |
| SMITH | NC | JANUARY | TOYOTA | RED | 10000 |
| SMITH | NC | MARCH | FORD | WHITE | 15000 |
| SMITH | NJ | FEBRUARY | TOYOTA | RED | 10000 |
| SMITH | NJ | MARCH | CHEVY | GREEN | 17000 |
| SMITH | NJ | MARCH | FORD | GREEN | 17000 |
| SMITH | NJ | APRIL | FORD | BLUE | 12000 |

*Fig. 11*

| DEALER | DATE | MEASURE |
|---|---|---|
| SMITH | ALL DATE | nu_car |
| SMITH | JANUARY | nu_car |
| SMITH | FEBRUARY | nu_car |
| SMITH | MARCH | nu_car |
| SMITH | APRIL | nu_car |
| SMITH | MAY | nu_car |
| SMITH CA | ALL DATE | nu_car |
| SMITH CA | JANUARY | nu_car |
| SMITH CA | FEBRUARY | nu_car |
| SMITH CA | MARCH | nu_car |
| SMITH CA | APRIL | nu_car |
| SMITH CA | MAY | nu_car |
| SMITH CT | ALL DATE | nu_car |
| SMITH CT | JANUARY | nu_car |
| SMITH CT | FEBRUARY | nu_car |
| SMITH CT | MARCH | nu_car |
| SMITH CT | APRIL | nu_car |
| SMITH CT | MAY | nu_car |
| SMITH NC | ALL DATE | nu_car |
| SMITH NC | JANUARY | nu_car |
| SMITH NC | FEBRUARY | nu_car |
| SMITH NC | MARCH | nu_car |
| SMITH NC | APRIL | nu_car |
| SMITH NC | MAY | nu_car |
| SMITH NJ | ALL DATE | nu_car |
| SMITH NJ | JANUARY | nu_car |
| SMITH NJ | FEBRUARY | nu_car |
| SMITH NJ | MARCH | nu_car |
| SMITH NJ | APRIL | nu_car |
| SMITH NJ | MAY | nu_car |

Fig. 12

| DEALER | DATE | CAR |
|---|---|---|
| SMITH | ALL DATE | CHEVY |
| SMITH | ALL DATE | FORD |
| SMITH | ALL DATE | FORD |
| SMITH | ALL DATE | FORD |
| SMITH | ALL DATE | FORD |
| SMITH | ALL DATE | TOYOTA |
| SMITH | ALL DATE | TOYOTA |
| SMITH | ALL DATE | TOYOTA |
| SMITH | JANUARY | TOYOTA |
| SMITH | FEBRUARY | TOYOTA |
| SMITH | FEBRUARY | TOYOTA |
| SMITH | MARCH | CHEVY |
| SMITH | MARCH | FORD |
| SMITH | MARCH | FORD |
| SMITH | APRIL | FORD |
| SMITH | APRIL | FORD |
| SMITH CA | ALL DATE | FORD |
| SMITH CA | APRIL | FORD |
| SMITH CT | ALL DATE | TOYOTA |
| SMITH CT | FEBRUARY | TOYOTA |
| SMITH NC | ALL DATE | FORD |
| SMITH NC | ALL DATE | TOYOTA |
| SMITH NC | JANUARY | TOYOTA |
| SMITH NC | MARCH | FORD |
| SMITH NJ | ALL DATE | CHEVY |
| SMITH NJ | ALL DATE | FORD |
| SMITH NJ | ALL DATE | FORD |
| SMITH NJ | ALL DATE | TOYOTA |
| SMITH NJ | FEBRUARY | TOYOTA |
| SMITH NJ | MARCH | CHEVY |
| SMITH NJ | MARCH | FORD |
| SMITH NJ | APRIL | FORD |

Fig. 14

| DEALER | DATE | CAR |
|---|---|---|
| SMITH | ALL DATE | CHEVY |
| SMITH | ALL DATE | FORD |
| SMITH | ALL DATE | TOYOTA |
| SMITH | JANUARY | TOYOTA |
| SMITH | FEBRUARY | TOYOTA |
| SMITH | MARCH | CHEVY |
| SMITH | MARCH | FORD |
| SMITH | APRIL | FORD |
| SMITH CA | ALL DATE | FORD |
| SMITH CA | APRIL | FORD |
| SMITH CT | ALL DATE | TOYOTA |
| SMITH CT | FEBRUARY | TOYOTA |
| SMITH NC | ALL DATE | FORD |
| SMITH NC | ALL DATE | TOYOTA |
| SMITH NC | JANUARY | TOYOTA |
| SMITH NC | MARCH | FORD |
| SMITH NJ | ALL DATE | CHEVY |
| SMITH NJ | ALL DATE | FORD |
| SMITH NJ | ALL DATE | TOYOTA |
| SMITH NJ | FEBRUARY | TOYOTA |
| SMITH NJ | MARCH | CHEVY |
| SMITH NJ | MARCH | FORD |
| SMITH NJ | APRIL | FORD |

*Fig. 15*

| DEALER | DATE | nu_car VALUE |
|---|---|---|
| SMITH | ALL DATE | 3 |
| SMITH | JANUARY | 1 |
| SMITH | FEBRUARY | 1 |
| SMITH | MARCH | 2 |
| SMITH | APRIL | 1 |
| SMITH CA | ALL DATE | 1 |
| SMITH CA | APRIL | 1 |
| SMITH CT | ALL DATE | 1 |
| SMITH CT | FEBRUARY | 1 |
| SMITH NC | ALL DATE | 2 |
| SMITH NC | JANUARY | 1 |
| SMITH NC | MARCH | 1 |
| SMITH NJ | ALL DATE | 3 |
| SMITH NJ | FEBRUARY | 1 |
| SMITH NJ | MARCH | 2 |
| SMITH NJ | APRIL | 1 |

Fig. 16

|  | ALL DATE | JANUARY | FEBRUARY | MARCH | APRIL | MAY |
|---|---|---|---|---|---|---|
| SMITH | 3 | 1 | 1 | 2 | 1 |  |
| SMITH CA | 1 |  |  |  | 1 |  |
| SMITH CT | 1 |  | 1 |  |  |  |
| SMITH NC | 2 | 1 |  | 1 |  |  |
| SMITH NJ | 3 |  | 1 | 2 | 1 |  |

Fig. 17

| DATE | MEASURES |
|------|----------|
| ALL DATE | dealer |
| ALL DATE | nu_car |
| ALL DATE | sales_n |
| JANUARY | dealer |
| JANUARY | nu_car |
| JANUARY | sales_n |
| FEBRUARY | dealer |
| FEBRUARY | nu_car |
| FEBRUARY | sales_n |
| MARCH | dealer |
| MARCH | nu_car |
| MARCH | sales_n |
| APRIL | dealer |
| APRIL | nu_car |
| APRIL | sales_n |
| MAY | dealer |
| MAY | nu_car |
| MAY | sales_n |

*Fig. 18*

| DATE | DEALER |
|------|--------|
| ALL DATE | FINCH |
| ALL DATE | JONES |
| ALL DATE | SMITH |
| JANUARY | FINCH |
| JANUARY | JONES |
| JANUARY | SMITH |
| FEBRUARY | FINCH |
| FEBRUARY | JONES |
| FEBRUARY | SMITH |
| MARCH | FINCH |
| MARCH | JONES |
| MARCH | SMITH |
| APRIL | FINCH |
| APRIL | JONES |
| APRIL | SMITH |
| MAY | FINCH |
| MAY | JONES |
| MAY | SMITH |

*Fig. 19*

| DATE | DEALER |
|---|---|
| ALL DATE | FINCH |
| ALL DATE | JONES |
| ALL DATE | SMITH |
| JANUARY | FINCH |
| JANUARY | JONES |
| JANUARY | SMITH |
| FEBRUARY | FINCH |
| FEBRUARY | JONES |
| FEBRUARY | SMITH |
| MARCH | FINCH |
| MARCH | SMITH |
| APRIL | FINCH |
| APRIL | SMITH |
| MAY | FINCH |
| MAY | JONES |

Fig. 21

| DATE KEY | DEALER VALUE | nu_car VALUE |
|---|---|---|
| ALL DATE | 3 | 0 |
| JANUARY | 3 | 0 |
| FEBRUARY | 3 | 0 |
| MARCH | 2 | 0 |
| APRIL | 2 | 0 |
| MAY | 2 | 0 |

Fig. 22

| DATE | CAR |
|---|---|
| ALL DATE | CHEVY |
| ALL DATE | CHRYSLER |
| ALL DATE | FORD |
| ALL DATE | TOYOTA |
| JANUARY | CHEVY |
| JANUARY | CHRYSLER |
| JANUARY | FORD |
| JANUARY | TOYOTA |
| FEBRUARY | CHEVY |
| FEBRUARY | CHRYSLER |
| FEBRUARY | FORD |
| FEBRUARY | TOYOTA |
| MARCH | CHEVY |
| MARCH | CHRYSLER |
| MARCH | FORD |
| MARCH | TOYOTA |
| APRIL | CHEVY |
| APRIL | CHRYSLER |
| APRIL | FORD |
| APRIL | TOYOTA |
| MAY | CHEVY |
| MAY | CHRYSLER |
| MAY | FORD |
| MAY | TOYOTA |

*Fig. 23*

| DATE | CAR |
|---|---|
| ALL DATE | CHEVY |
| ALL DATE | CHRYSLER |
| ALL DATE | FORD |
| ALL DATE | TOYOTA |
| JANUARY | CHRYSLER |
| JANUARY | FORD |
| JANUARY | TOYOTA |
| FEBRUARY | CHRYSLER |
| FEBRUARY | TOYOTA |
| MARCH | CHEVY |
| MARCH | FORD |
| APRIL | CHEVY |
| APRIL | FORD |
| MAY | FORD |
| MAY | TOYOTA |

Fig. 25

| DATE KEY | DEALER VALUE | nu_car VALUE |
|---|---|---|
| ALL DATE | 3 | 4 |
| JANUARY | 3 | 3 |
| FEBRUARY | 3 | 2 |
| MARCH | 2 | 2 |
| APRIL | 2 | 2 |
| MAY | 2 | 2 |

Fig. 26

|  | ALL DATE | JANUARY | FEBRUARY | MARCH | APRIL | MAY |
|---|---|---|---|---|---|---|
| DEALER | 3 | 3 | 3 | 2 | 2 | 2 |
| nu_car | 4 | 3 | 2 | 2 | 2 | 2 |
| sales_n | 20 | 5 | 5 | 4 | 3 | 3 |

Fig. 27

| DEALER | DATE | MEASURE |
|---|---|---|
| SMITH | ALL DATE | nu_usacar |
| SMITH | JANUARY | nu_usacar |
| SMITH | FEBRUARY | nu_usacar |
| SMITH | MARCH | nu_usacar |
| SMITH | APRIL | nu_usacar |
| SMITH | MAY | nu_usacar |
| SMITH CA | ALL DATE | nu_usacar |
| SMITH CA | JANUARY | nu_usacar |
| SMITH CA | FEBRUARY | nu_usacar |
| SMITH CA | MARCH | nu_usacar |
| SMITH CA | APRIL | nu_usacar |
| SMITH CA | MAY | nu_usacar |
| SMITH CT | ALL DATE | nu_usacar |
| SMITH CT | JANUARY | nu_usacar |
| SMITH CT | FEBRUARY | nu_usacar |
| SMITH CT | MARCH | nu_usacar |
| SMITH CT | APRIL | nu_usacar |
| SMITH CT | MAY | nu_usacar |
| SMITH NC | ALL DATE | nu_usacar |
| SMITH NC | JANUARY | nu_usacar |
| SMITH NC | FEBRUARY | nu_usacar |
| SMITH NC | MARCH | nu_usacar |
| SMITH NC | APRIL | nu_usacar |
| SMITH NC | MAY | nu_usacar |
| SMITH NJ | ALL DATE | nu_usacar |
| SMITH NJ | JANUARY | nu_usacar |
| SMITH NJ | FEBRUARY | nu_usacar |
| SMITH NJ | MARCH | nu_usacar |
| SMITH NJ | APRIL | nu_usacar |
| SMITH NJ | MAY | nu_usacar |

Fig. 28

| DEALER | DATE | CAR |
|---|---|---|
| SMITH | ALL DATE | CHEVY |
| SMITH | ALL DATE | CHRYSLER |
| SMITH | ALL DATE | FORD |
| SMITH | JANUARY | CHEVY |
| SMITH | JANUARY | CHRYSLER |
| SMITH | JANUARY | FORD |
| SMITH | FEBRUARY | CHEVY |
| SMITH | FEBRUARY | CHRYSLER |
| SMITH | FEBRUARY | FORD |
| SMITH | MARCH | CHEVY |
| SMITH | MARCH | CHRYSLER |
| SMITH | MARCH | FORD |
| SMITH | APRIL | CHEVY |
| SMITH | APRIL | CHRYSLER |
| SMITH | APRIL | FORD |
| SMITH | MAY | CHEVY |
| SMITH | MAY | CHRYSLER |
| SMITH | MAY | FORD |

| | | |
|---|---|---|
| SMITH NJ | ALL DATE | CHEVY |
| SMITH NJ | ALL DATE | CHRYSLER |
| SMITH NJ | ALL DATE | FORD |
| SMITH NJ | JANUARY | CHEVY |
| SMITH NJ | JANUARY | CHRYSLER |
| SMITH NJ | JANUARY | FORD |
| SMITH NJ | FEBRUARY | CHEVY |
| SMITH NJ | FEBRUARY | CHRYSLER |
| SMITH NJ | FEBRUARY | FORD |
| SMITH NJ | MARCH | CHEVY |
| SMITH NJ | MARCH | CHRYSLER |
| SMITH NJ | MARCH | FORD |
| SMITH NJ | APRIL | CHEVY |
| SMITH NJ | APRIL | CHRYSLER |
| SMITH NJ | APRIL | FORD |
| SMITH NJ | MAY | CHEVY |
| SMITH NJ | MAY | CHRYSLER |
| SMITH NJ | MAY | FORD |

Fig. 29

| DEALER | DATE | CAR |
|---|---|---|
| SMITH | ALL DATE | CHEVY |
| SMITH | ALL DATE | FORD |
| SMITH | ALL DATE | FORD |
| SMITH | ALL DATE | FORD |
| SMITH | ALL DATE | FORD |
| SMITH | MARCH | CHEVY |
| SMITH | MARCH | FORD |
| SMITH | MARCH | FORD |
| SMITH | APRIL | FORD |
| SMITH | APRIL | FORD |
| SMITH CA | ALL DATE | FORD |
| SMITH CA | APRIL | FORD |
| SMITH NC | ALL DATE | FORD |
| SMITH NC | MARCH | FORD |
| SMITH NJ | ALL DATE | CHEVY |
| SMITH NJ | ALL DATE | FORD |
| SMITH NJ | ALL DATE | FORD |
| SMITH NJ | MARCH | CHEVY |
| SMITH NJ | MARCH | FORD |
| SMITH NJ | APRIL | FORD |

Fig. 30

|  | ALL DATE | JANUARY | FEBRUARY | MARCH | APRIL | MAY |
|---|---|---|---|---|---|---|
| SMITH | 2 |  |  | 2 | 1 |  |
| SMITH CA | 1 |  |  |  | 1 |  |
| SMITH NC | 1 |  |  | 1 |  |  |
| SMITH NJ | 2 |  |  | 2 | 1 |  |

Fig. 33

| DEALER | DATE | CAR |
|---|---|---|
| SMITH | ALL DATE | CHEVY |
| SMITH | ALL DATE | FORD |
| SMITH | MARCH | CHEVY |
| SMITH | MARCH | FORD |
| SMITH | APRIL | FORD |
| SMITH CA | ALL DATE | FORD |
| SMITH CA | APRIL | FORD |
| SMITH NC | ALL DATE | FORD |
| SMITH NC | MARCH | FORD |
| SMITH NJ | ALL DATE | CHEVY |
| SMITH NJ | ALL DATE | FORD |
| SMITH NJ | MARCH | CHEVY |
| SMITH NJ | MARCH | FORD |
| SMITH NJ | APRIL | FORD |

Fig. 31

| DEALER | DATE | n_usacar VALUE |
|---|---|---|
| SMITH | ALL DATE | 2 |
| SMITH | MARCH | 2 |
| SMITH | APRIL | 1 |
| SMITH CA | ALL DATE | 1 |
| SMITH CA | APRIL | 1 |
| SMITH NC | ALL DATE | 1 |
| SMITH NC | MARCH | 1 |
| SMITH NJ | ALL DATE | 2 |
| SMITH NJ | MARCH | 2 |
| SMITH NJ | APRIL | 1 |

Fig. 32

| DATE | DEALER | MEASURES |
|---|---|---|
| ALL DATE | FINCH | nu_car |
| ALL DATE | JONES | nu_car |
| ALL DATE | SMITH | nu_car |
| JANUARY | FINCH | nu_car |
| JANUARY | JONES | nu_car |
| JANUARY | SMITH | nu_car |
| FEBRUARY | FINCH | nu_car |
| FEBRUARY | JONES | nu_car |
| FEBRUARY | SMITH | nu_car |
| MARCH | FINCH | nu_car |
| MARCH | JONES | nu_car |
| MARCH | SMITH | nu_car |
| APRIL | FINCH | nu_car |
| APRIL | JONES | nu_car |
| APRIL | SMITH | nu_car |
| MAY | FINCH | nu_car |
| MAY | JONES | nu_car |
| MAY | SMITH | nu_car |

*Fig. 35*

| DATE | DEALERS | CARS |
|---|---|---|
| ALL DATE | FINCH | CHEVY |
| ALL DATE | FINCH | CHRYSLER |
| ALL DATE | FINCH | FORD |
| ALL DATE | FINCH | TOYOTA |
| ALL DATE | JONES | CHEVY |
| ALL DATE | JONES | CHRYSLER |
| ALL DATE | JONES | FORD |
| ALL DATE | JONES | TOYOTA |
| ALL DATE | SMITH | CHEVY |
| ALL DATE | SMITH | CHRYSLER |
| ALL DATE | SMITH | FORD |
| ALL DATE | SMITH | TOYOTA |
| JANUARY | FINCH | CHEVY |
| JANUARY | FINCH | CHRYSLER |
| JANUARY | FINCH | FORD |
| JANUARY | FINCH | TOYOTA |
| ⋮ | ⋮ | ⋮ |
| MAY | FINCH | CHEVY |
| MAY | FINCH | CHRYSLER |
| MAY | FINCH | FORD |
| MAY | FINCH | TOYOTA |
| MAY | JONES | CHEVY |
| MAY | JONES | CHRYSLER |
| MAY | JONES | FORD |
| MAY | JONES | TOYOTA |
| MAY | SMITH | CHEVY |
| MAY | SMITH | CHRYSLER |
| MAY | SMITH | FORD |
| MAY | SMITH | TOYOTA |

*Fig. 36*

| DEALER | DATE | CAR |
|---|---|---|
| FINCH | ALL DATE | CHEVY |
| FINCH | ALL DATE | CHRYSLER |
| FINCH | ALL DATE | CHRYSLER |
| FINCH | ALL DATE | FORD |
| FINCH | ALL DATE | FORD |
| FINCH | ALL DATE | FORD |
| FINCH | ALL DATE | TOYOTA |
| JONES | ALL DATE | TOYOTA |
| JONES | ALL DATE | TOYOTA |
| JONES | ALL DATE | TOYOTA |
| JONES | ALL DATE | TOYOTA |
| JONES | ALL DATE | TOYOTA |
| SMITH | ALL DATE | CHEVY |
| SMITH | ALL DATE | FORD |
| SMITH | ALL DATE | FORD |
| SMITH | ALL DATE | FORD |
| SMITH | ALL DATE | FORD |
| SMITH | ALL DATE | TOYOTA |
| SMITH | ALL DATE | TOYOTA |
| SMITH | ALL DATE | TOYOTA |

| FINCH | JANUARY | CHRYSLER |
|---|---|---|
| FINCH | JANUARY | FORD |
| JONES | JANUARY | TOYOTA |
| JONES | JANUARY | TOYOTA |
| SMITH | JANUARY | TOYOTA |
| FINCH | FEBRUARY | CHRYSLER |
| FINCH | FEBRUARY | TOYOTA |
| JONES | FEBRUARY | TOYOTA |
| SMITH | FEBRUARY | TOYOTA |
| SMITH | FEBRUARY | TOYOTA |
| FINCH | MARCH | FORD |
| SMITH | MARCH | CHEVY |
| SMITH | MARCH | FORD |
| SMITH | MARCH | FORD |
| FINCH | APRIL | CHEVY |
| SMITH | APRIL | FORD |
| SMITH | APRIL | FORD |
| FINCH | MAY | FORD |
| JONES | MAY | TOYOTA |
| JONES | MAY | TOYOTA |

Fig. 37

| DEALER | DATE | CAR |
|---|---|---|
| FINCH | ALL DATE | CHEVY |
| FINCH | ALL DATE | CHRYSLER |
| FINCH | ALL DATE | FORD |
| FINCH | ALL DATE | TOYOTA |
| JONES | ALL DATE | TOYOTA |
| SMITH | ALL DATE | CHEVY |
| SMITH | ALL DATE | FORD |
| SMITH | ALL DATE | TOYOTA |
| FINCH | JANUARY | CHRYSLER |
| FINCH | JANUARY | FORD |
| JONES | JANUARY | TOYOTA |
| SMITH | JANUARY | TOYOTA |
| FINCH | FEBRUARY | CHRYSLER |
| FINCH | FEBRUARY | TOYOTA |
| JONES | FEBRUARY | TOYOTA |
| SMITH | FEBRUARY | TOYOTA |
| FINCH | MARCH | FORD |
| SMITH | MARCH | CHEVY |
| SMITH | MARCH | FORD |
| FINCH | APRIL | CHEVY |
| SMITH | APRIL | FORD |
| FINCH | MAY | FORD |
| JONES | MAY | TOYOTA |

Fig. 38

| DATE | CAR |
|---|---|
| ALL DATE | CHEVY |
| ALL DATE | CHRYSLER |
| ALL DATE | FORD |
| ALL DATE | TOYOTA |
| JANUARY | CHRYSLER |
| JANUARY | FORD |
| JANUARY | TOYOTA |
| FEBRUARY | CHRYSLER |
| FEBRUARY | TOYOTA |
| MARCH | CHEVY |
| MARCH | FORD |
| APRIL | CHEVY |
| APRIL | FORD |
| MAY | FORD |
| MAY | TOYOTA |

Fig. 39

| DATE KEY | nu_car VALUE |
|---|---|
| ALL DATE | 4 |
| JANUARY | 3 |
| FEBRUARY | 2 |
| MARCH | 2 |
| APRIL | 2 |
| MAY | 2 |

Fig. 40

| | TOTAL |
|---|---|
| ALL DATE | 4 |
| JANUARY | 3 |
| FEBRUARY | 2 |
| MARCH | 2 |
| APRIL | 2 |
| MAY | 2 |

Fig. 41

COMPUTER-IMPLEMENTED SYSTEMS AND METHODS FOR PROVIDING A COUNTING MEASURE

FIELD

The technology described in this patent document relates generally to the field of electronic data storage and retrieval. More particularly, systems and methods are described for providing a counting measure in a hierarchical database.

BACKGROUND

Measures for use in analyzing data in a hierarchical database, such as an Online Analytical Processing (OLAP) database, are known in the art. One such measure is the distinct count function for the Multidimensional Expression (MDX) language, which may be used to query OLAP data to count the distinct, non-empty tuples in a set. For example, the distinct count function may be used to answer the question, "How many customers are buying each of my products?" However, the traditional distinct count function is processor intensive and may require a significant amount of processing time to process a reasonably sized data set. The processing requirements of a traditional distinct count function may be illustrated by the following example query:

with
  member measures.prod_dcount as
    'distinctcount ({[products].[product].members})'
  select
  {customer.members} on rows,
  {date.years.members} on columns
  from prodcube
  where measures.prod_dcount Assume for the purposes of this example that the data set includes 8 year members and 176 customer members. A table showing results of the above query is set forth in FIG. 1. The query results in this example includes all of the members of the product level on which the distinct count function is performed. The distinct count function is traditionally processed in MDX by running separate queries to gather and accumulate the number of unique members out of all of the members of the product level for each of the 1408 crossings of the x and y axis. That is, 1408 separate queries are required to return a distinct count value.

SUMMARY

In accordance with the teachings described herein, systems and methods are provided for calculating a distinct count value from data stored in a hierarchical database. A counting measure may be defined in the hierarchical database such that the counting measure is associated with members of a first category of data to be stored in the hierarchical database. A query may be received that identifies the counting measure. The hierarchical database may be queried to identify members of the first category of data that are presently in the hierarchical database. A data structure may be generated that includes the members of the first category of data that are stored in the hierarchical database. One or more distinct count values may be calculated for the members of the first category of data that are stored in the hierarchical database.

BRIEF DESCRIPTION OF THE DRAWINGS

FIGS. 11 is a table depicting data from an example hierarchical database.

FIG. 12-33 are tables depicting results from example database queries.

FIGS. 35-41 are tables depicting results from an example database query that includes a counting measure within an aggregate function.

DETAILED DESCRIPTION

Figures 1, 2:
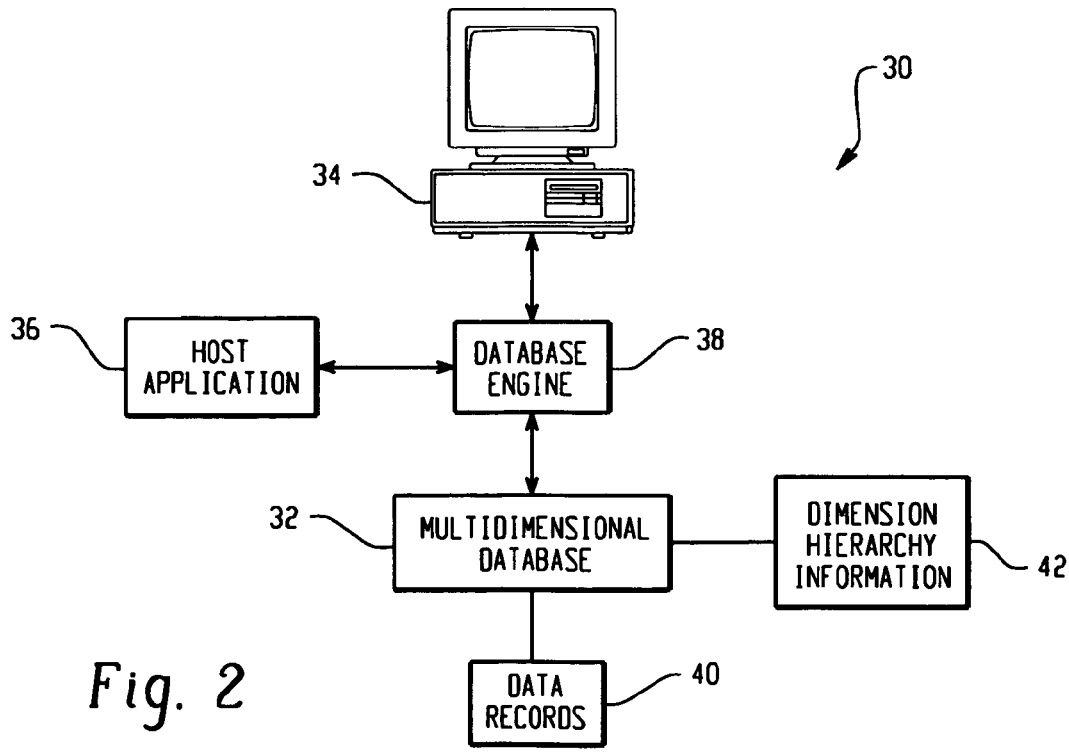
FIG. 1 depicts a table showing the results of an example query that includes a distinct count function.
FIG. 2 is a block diagram depicting computer and software components for use with a multidimensional database.

FIG. 2 depicts at 30 a system for use with a multidimensional database 32. An end user 34 or a host application 36 (such as a data warehousing application, or an OLAP or a data mining application) initiates a query to the multidimensional database 32 via a database engine 38. The database engine 38 processes the query, such as by parsing and translating, optimizing, and evaluating in order to formulate a logical expression from the query.

The logical expression can be in the form of a plurality of terms connected via a plurality of operators such as logical operators, relational operators, arithmetic operators, etc. The engine 38 then scans the multidimensional database 32 to locate and relate data records 40 that fulfill the logical expression and return the results to the end user 34 or host application 36.

Dimensional hierarchy data 42 is provided to assist in the location of the data records 40. The dimensional hierarchy data 42 describes the hierarchy of the dimensions contained within the database 32. As an illustration, the dimensional hierarchy data 42 may describe which dimensions in the database 32 are parents of other dimensions.

The results can be the data records themselves, such as a single data record for a singleton answer or a group of data records for an answer grid. However, it should be understood that many different types of results can be provided, such as an answer matrix in a plurality of dimensions, or can be the result of an operation on the data records such as in the form of summation of the data records.

Figure 3:
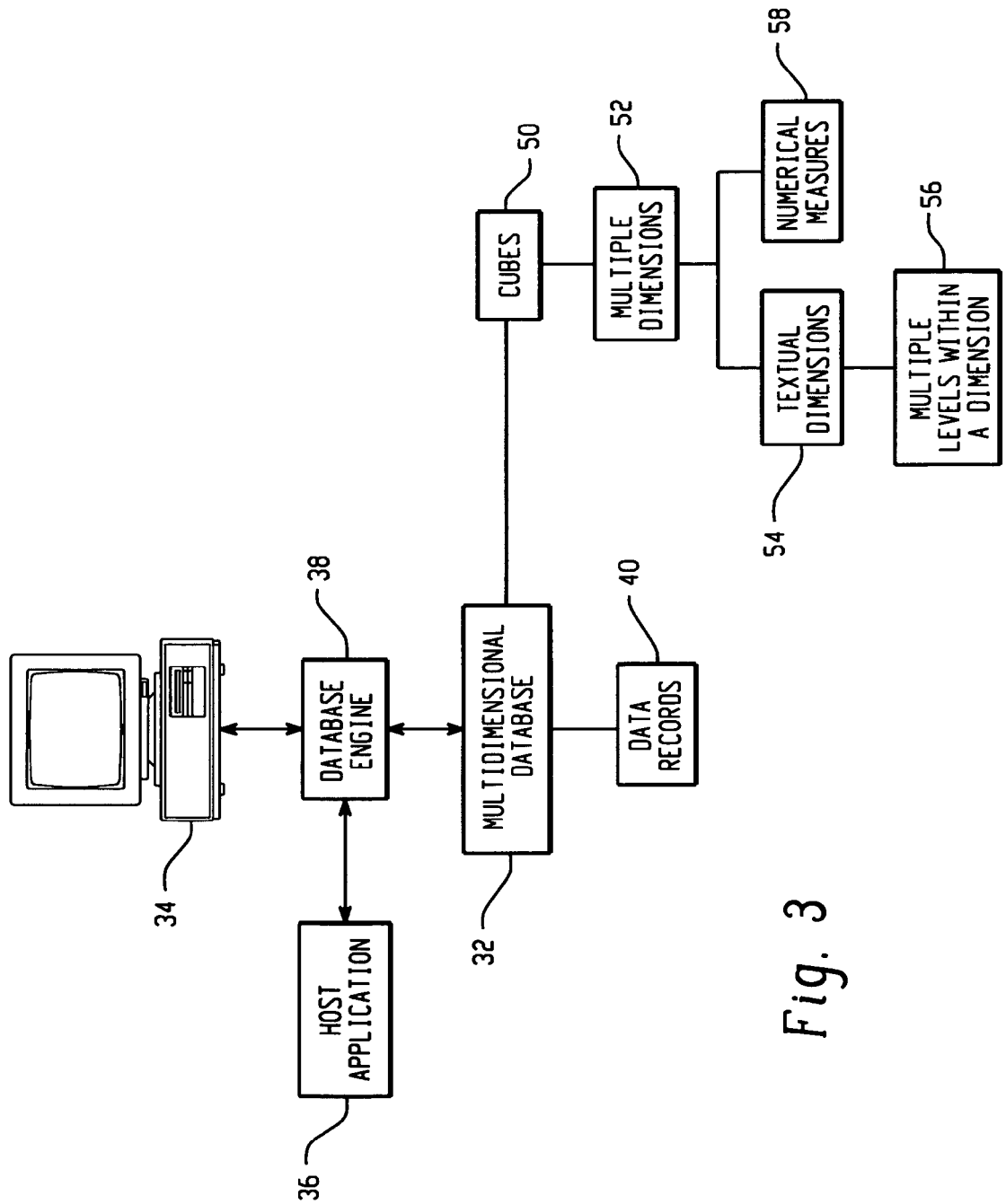
FIG. 3 is a block diagram depicting characteristics of a multidimensional database.

FIG. 3 illustrates characteristics of a multidimensional database 32. In a multidimensional database 32, data records 40 contain numerical measures 58 and textual (e.g., feature) dimensions 54 that characterize the numerical measures 58. The multidimensional database 32 views data records 40 as cubes 50 that contain hierarchies of the dimensions 52. Stated another way, a cube 50 represents a particular set of dimensions that the user can use to view the data records 40.

The dimensions 52 of the database's cubes are used for selecting and aggregating data at the desired level of detail. A textual dimension 54 is organized into a hierarchy composed of multiple levels 56, each representing a level of detail required by the desired analysis. For example, a textual dimension could contain geography information. The textual dimension could be arranged hierarchically starting from a general geographical designation to a more specific one— e.g., the geography hierarchy could be arranged at a state level which could decompose to a county geographical level which could decompose even further, such as to a city or township geographical level. A more detailed example about the characteristics of a multidimensional database 32 is discussed with reference to FIGS. 4 and 5.

Figures 4, 5:
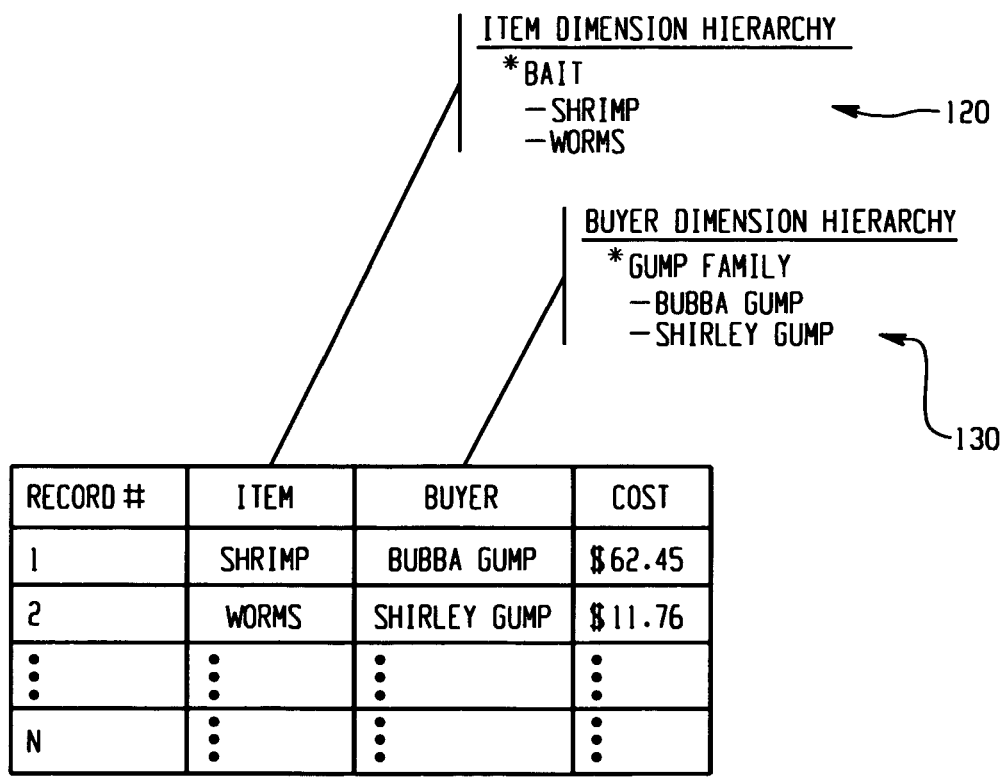
FIGS. 4 and 5 illustrate values and dimensions in an exemplary multidimensional database.

FIG. 4 shows at 100 a portion of an exemplary multidimensional database. In this example, the data records are numbered in column 102. Each record contains "Cost" numerical values in column 104. Columns 106 and 108 contain textual information that provide context for a cost measure. Column 106 provides context about what "Item" is the subject of the cost in column 104. Similarly, column 108 provides context about who the "Buyer" is that purchased the "Item." As an illustration, record 110 specifies that "Bubba Gump" was the buyer of the item "shrimp." The cost of the purchase was $62.45. The discrete values for record 110 (e.g., "Shrimp") are also known as elements.

For the exemplary multidimensional database, the dimensions "Item" and "Buyer" can be further represented as having the multiple dimensional levels shown in FIG. 5. As shown at 120, the "Item" dimension can have a hierarchy wherein a particular level within the hierarchy is specifically directed to "Bait" items. The "Bait" level contains elements or members "Shrimp", "Worms", etc. For the Buyer dimension as shown at 130, the "Buyer" dimension can have a hierarchy wherein a particular level within the hierarchy is the "Gump Family" (i.e., where the Gump Family are the buyers). The "Gump Family" level contains elements or members "Bubba Gump", "Shirley Gump", etc.

Figure 6:
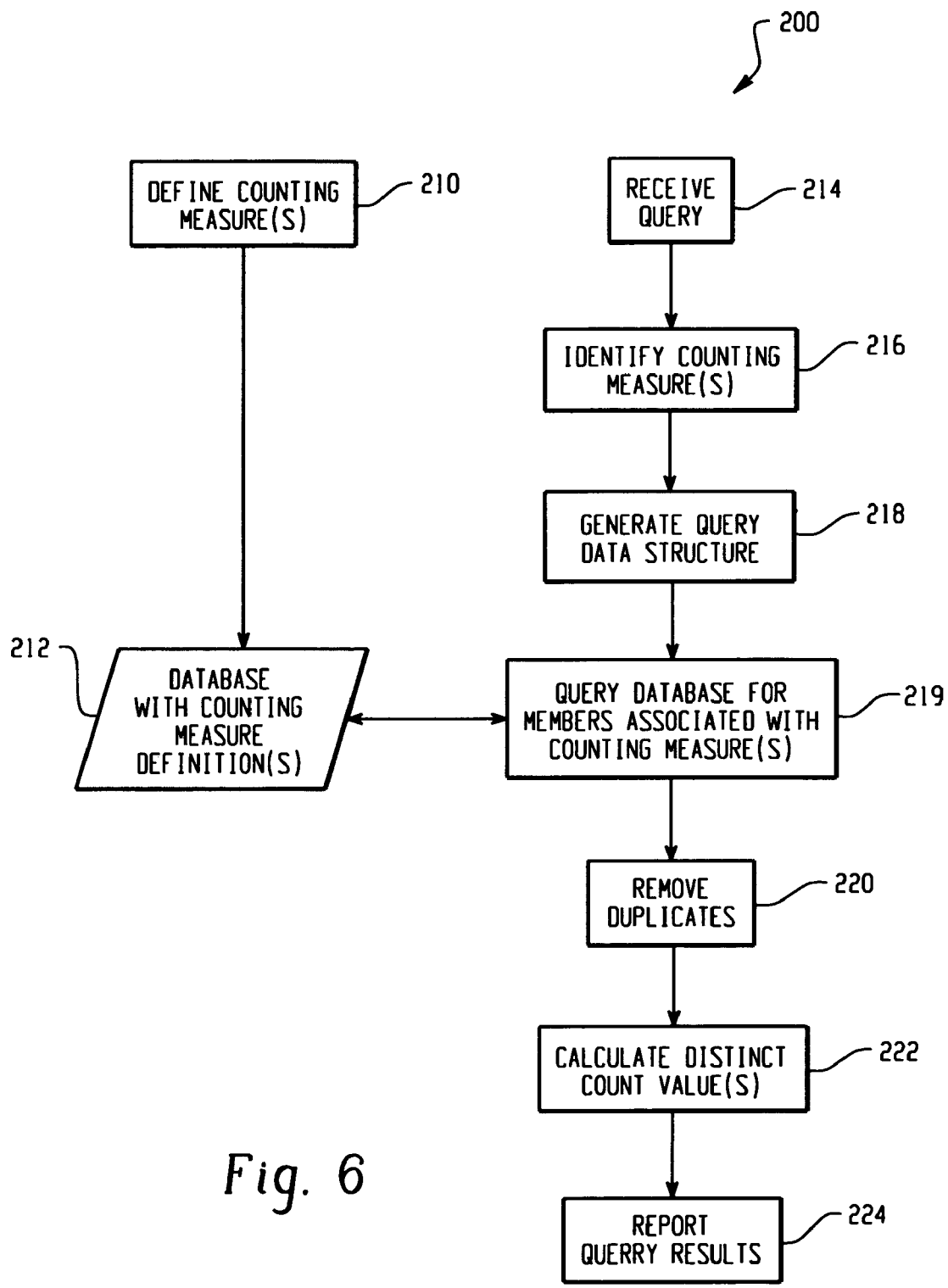
FIG. 6 is an example process flow diagram for a computer-implemented system for calculating a distinct count value from data stored in a hierarchical database using a pre-defined counting measure.

FIG. 6 is an example process flow diagram 200 for a computer-implemented system for calculating a distinct count value from data stored in a hierarchical database using a counting measure. At step 210, the counting measure is defined in a hierarchical database 212 (e.g., an OLAP cube) such that the counting measure is associated with members of a category of data to be stored in the hierarchical database. The data associated with the counting measure may be the members of a level in the hierarchical database, or may be members of some other defined set of data, such as a global named set. The counting measure may be defined at cube creation. As an example, the following software instructions may be used to define a counting measure for members of the product level described above with reference to FIG. 1.

Measure prod_ncount
    stat=nunique
    level=product

For the purposes of this and other examples set forth herein, the term "nunique" is used as software instructions for identifying the counting measure for calculating a distinct count value. In the above example, the measure "prod_ncount" is defined as a counting measure for calculating a distinct count value (stat=nunique) and is associated with the data in the "product" level of the hierarchical database.

With reference again to FIG. 6, a query is received at step 214 that identifies one or more categories of data (e.g., levels) from the hierarchical database and also identifies the pre-defined counting measure. The pre-defined counting measure is identified in the query at step 216, and in response a query data structure is generated at step 218. The query data structure identifies at least a counting measure and one or more categories of data on which the counting measure is to be applied. The one or more categories of data identified in the query data structure may, for example, include one or more levels in the hierarchical database 212 and/or one or more global named set of data.

In step 219, the database is queried to identify the members associated with the counting measure(s) and the one or more categories of data on which the counting measure is to be applied. The step of querying the database may also, in some examples, include querying a database cache. The members obtained from the database in step 219 may, for example, be stored in a temporary data structure. Duplicate rows of data are then removed from the retrieved data at step 220. The duplicate rows of data may, for example, be removed from the temporary data structure by storing a single instance of each data crossing in a reduced temporary data structure. The distinct count value is then calculated at step 222, and the results are reported at step 224.

It should be understood that similar to the other processing flows described herein, one or more of the steps and the order in the flowchart may be altered, deleted, modified and/or augmented and still achieve the desired outcome.

Following is an example of an MDX query that may be used to return a distinct count value for the product level data described above with reference to FIG. 1.

select
    {customer.members} on rows,
    {data.years.members} on columns,
  from prodcube
  where measures.prod_ncount Using the process described in FIG. 6, the above query will return the same result as the traditional distinct count function described above with reference to FIG. 1. However, the use of the pre-defined counting measure (prod_ncount) in the above example returns a distinct count value using only a single query, compared to the 1408 separate queries required to return a result using the distinct count function in the example of FIG. 1.

Figure 7:
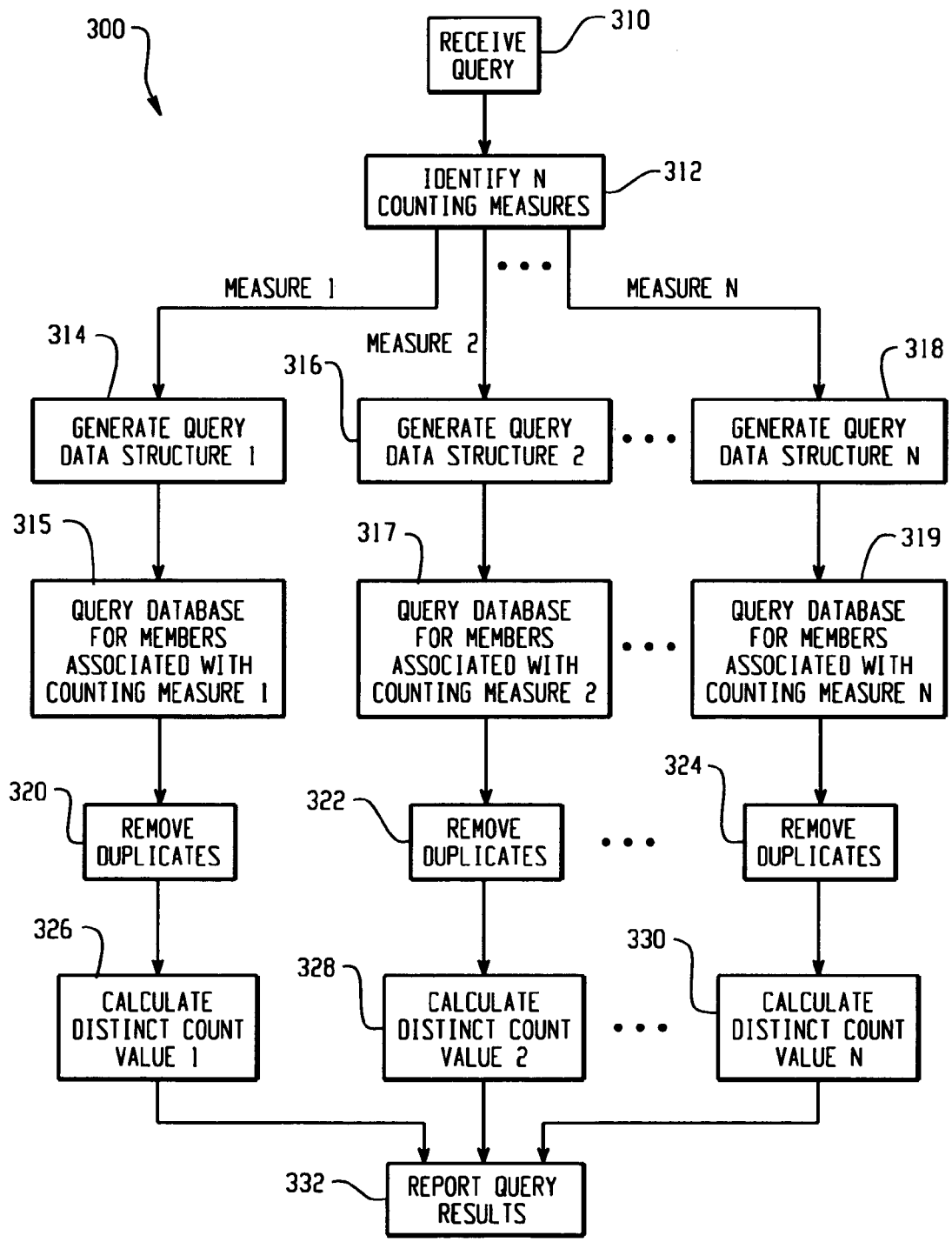
FIG. 7 is another example process flow diagram for a computer-implemented system for calculating a distinct count value using a pre-defined counting measure.

FIG. 7 is another example process flow diagram 300 for a computer-implemented system for calculating a distinct count value using a counting measure. This example 300 illustrates that a separate query may be generated for each counting measure included in the query.

The query is received at step 310, identifying one or more categories of data (e.g., levels) from the hierarchical database and also identifies the pre-defined counting measure. Although not illustrated in this example 300, the counting measure may be defined in a hierarchical database (e.g., an OLAP cube) such that the counting measure is associated with members of a category of data (e.g., members of a level or global named set) to be stored in the hierarchical database.

In step 312, a plurality (N) of counting measures are identified in the query, and a query is generated for each identified counting measure (1 through N), as illustrated in steps 314, 316 and 318. The database is queried in steps 315, 317 and 319 to identify the members associated with the counting measures and also to identify the members associated with the one or more categories of data on which the counting measures are to be applied. Duplicate rows of data are removed from the retrieved data at steps 320, 322, 325, and distinct count values are calculated at steps 326, 328 and 330. The results of each query (1 through N) are then reported in step 332.

Figure 8:
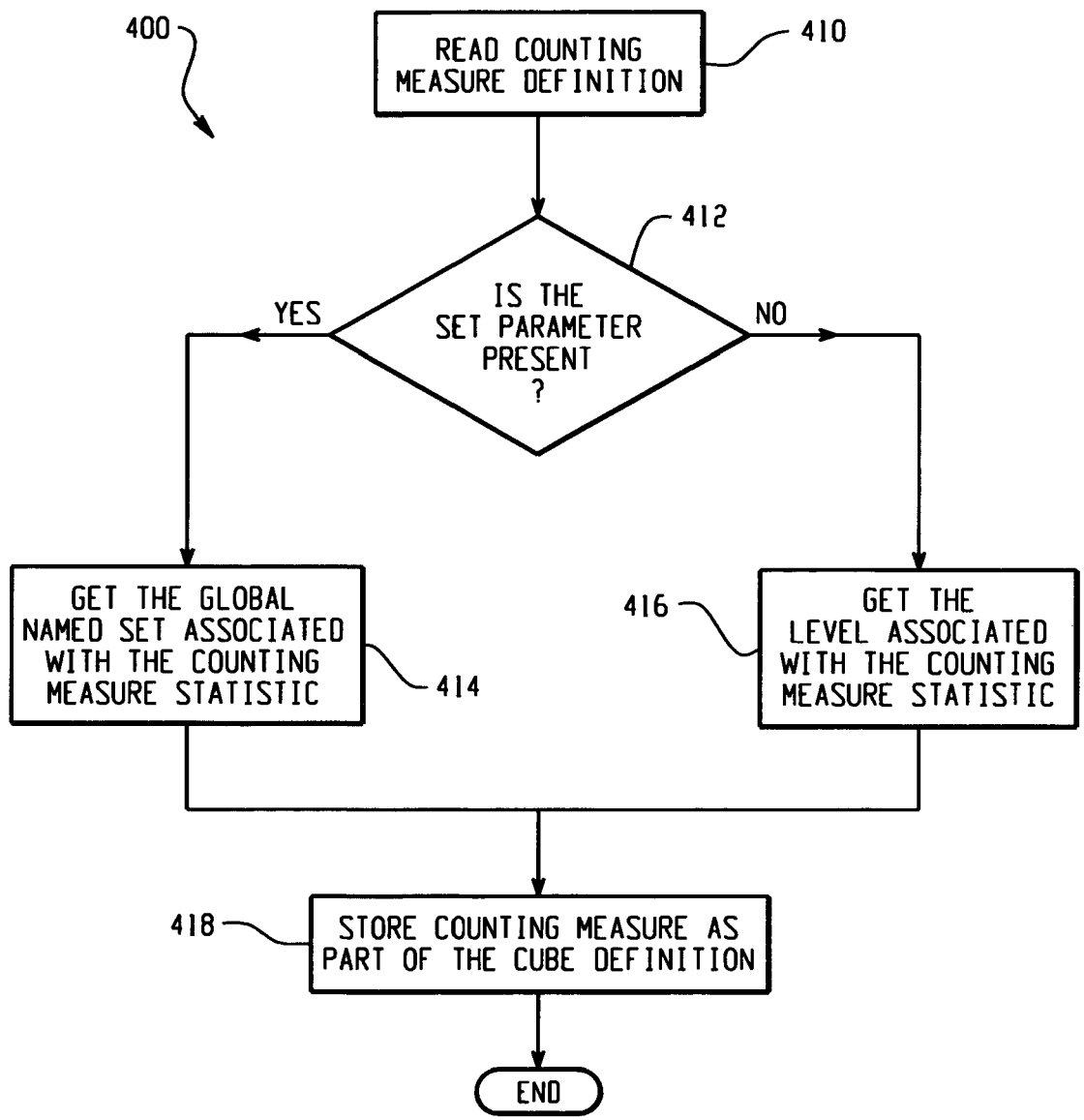
FIG. 8 is a flow diagram depicting an example method for defining a counting measure in a hierarchical database, such as an OLAP cube.

FIG. 8 is a flow diagram depicting an example method 400 for defining a counting measure in a hierarchical database, such as an OLAP cube. In step 410, software instructions defining the counting measure are received. The counting measure may be defined by relating the measure to a set of data in the hierarchical database, such as a level of the cube hierarchy or a global named set. Following is an example format for software instructions in the MDX language that may be used to define the counting measure.

Measure nunique_measurename
        Stat=nunique
        <level=level_name>
        <hierarchy=hierarchy_name>
        <set=global_named_set>;

The "level=" parameter in the above example provides the name of a level in the hierarchical database that is being associated with the counting measure as well as the name of the column in the input data associated with that level. This level parameter may be optional in the sense that if neither the level or set parameter is present, then it may be assumed that the counting measure (nunique_measurename) is the name of the level and the <levelname> parameter may be set to this. The hierarchy parameter may only be required if the <levelname> parameter appears in more than one hierarchy. Also, the set parameter may be used in place of the level/hierarchy parameters to associate the counting measure with a global named set.

Referring again to FIG. 8, step 412 determines if a global named set is identified in the counting measure definition. If the definition includes a global named set, then the method proceeds to step 414 to determine the global named set associated with the counting measure identified in step 410. Otherwise, the method proceeds to step 416 to determine the level of the hierarchical database associated with the counting measure. In step 418, the method stores the counting measure definition as part of the cube definition.

Figure 9:
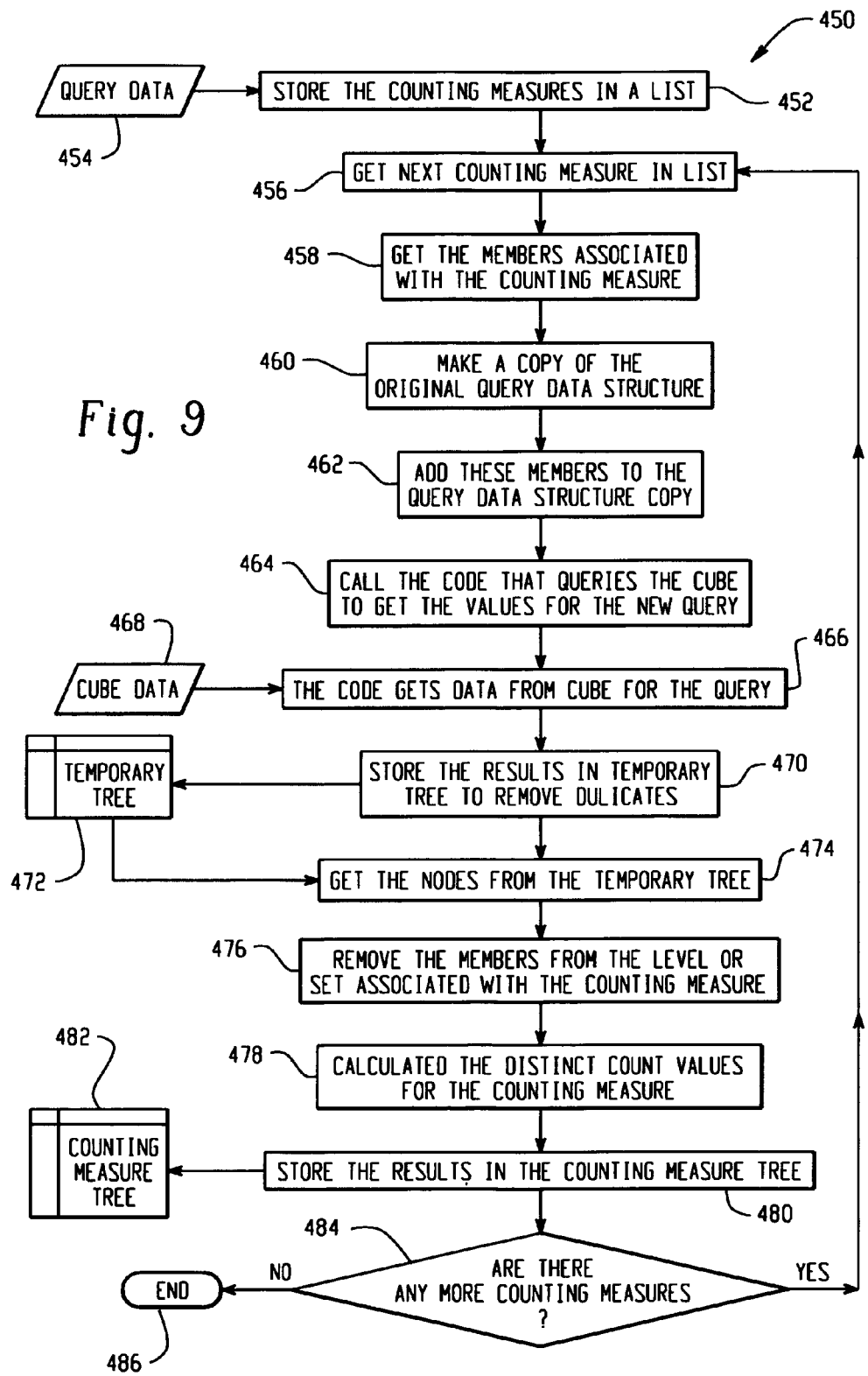
FIG. 9 is a flow diagram depicting an example method for calculating one or more distinct counting values.

FIG. 9 is a flow diagram depicting an example method 450 for calculating one or more distinct counting values. In step 452, the method receives a database query 454, such as an MDX query, decodes the query data 454 to identify one or more counting measures, and stores any identified counting measures. The first identified counting measure (if more than one) is then retrieved at step 456, and a query is executed for the counting measure, starting at step 458.

At step 458, all of the members associated with the counting measure are identified from the measure definition. The counting measure may, for example, be associated with all of the members of a level in the hierarchical database or may be associated with a global named set of data from the database. The data from the original query data structure 454 is copied into the query data structure in step 460, and all of the members associated with the counting measure are added to the query data structure in step 462. The database 468 is then queried at steps 464 and 466 to retrieve the data members, and the results are stored in a temporary data structure (tree) 472 at step 470 to remove any duplicate rows.

A distinct count value(s) for the counting measure is determined at steps 474, 476 and 478 by iterating through each node of the temporary tree 472. In step 474, each node of the temporary tree 472 is read, and the members from the level or set associated with the counting measure are removed from the node key at step 476 and are added to a counting measure tree 482 at step 480. At step 478, a distinct count value for the member is calculated by setting the distinct count value to one the first time that the member is added to the counting measure tree 482, and then incrementing the distinct count value each additional time (if any) that the member is removed from the node key. Once all of the nodes in the temporary tree 472 have been processed, the method proceeds to step 484.

At step 484, the method determines if there are any additional counting measures from the original query 454 that need to be processed. If so, then the method returns to step 456 to retrieve the counting measure and execute a new query. Otherwise, the method ends at step 486.

Figure 10:
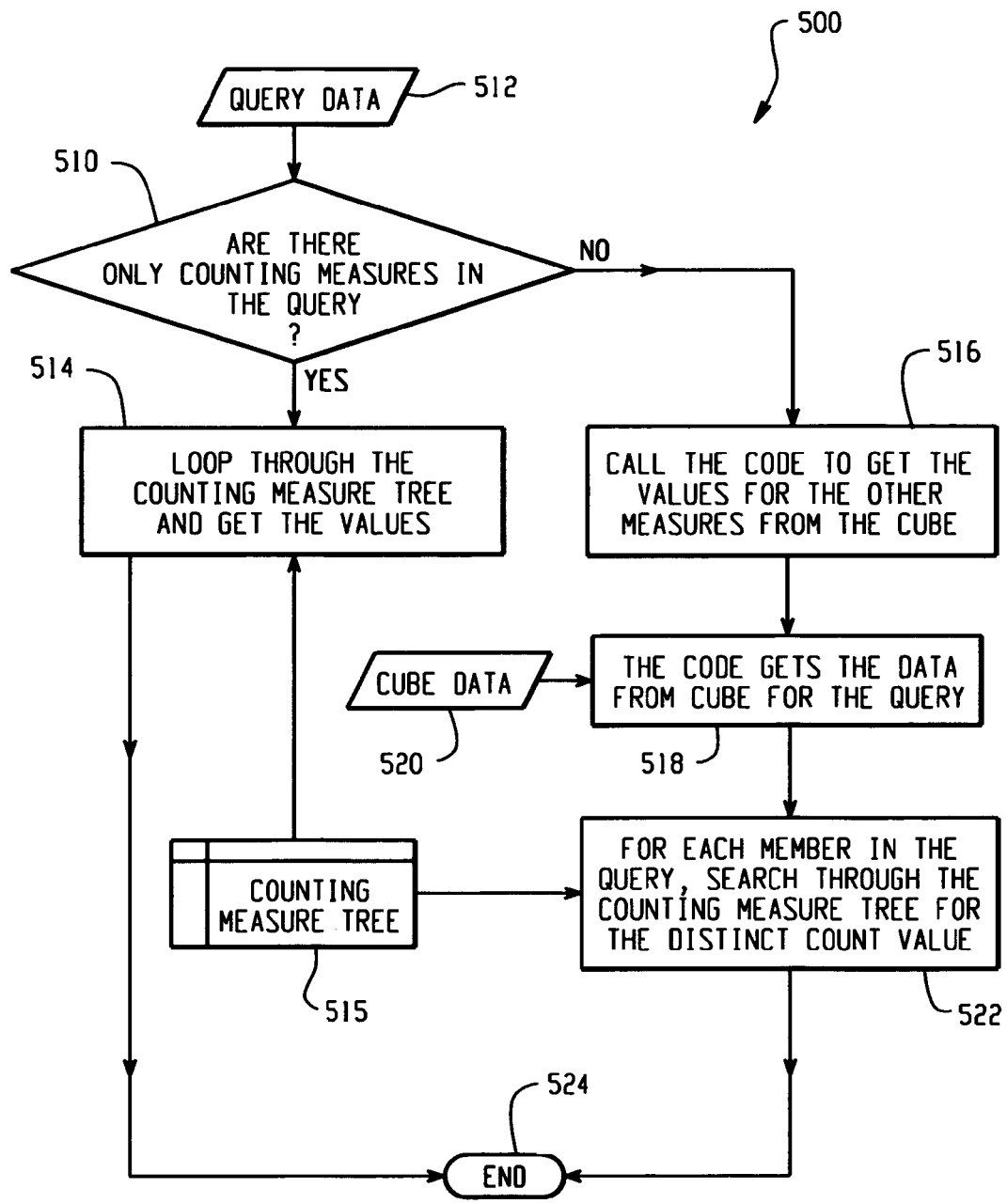
FIG. 10 is a flow diagram depicting an example method for retrieving distinct count values from a counting measure tree.

FIG. 10 is a flow diagram depicting an example method 500 for retrieving distinct count values from a counting measure tree. At step 510, the query data 512 is examined to determine if the only measures included in the data 510 are counting measures. If the only measures are counting measures, then the counting measure tree 515 is traversed at step 514 to retrieve the values from the tree, and the method ends at step 524. Otherwise, if the query 510 data includes one or more measure types other than a counting measure, then the method proceeds to step 516.

At step 516, software instructions configured to query the database are executed to retrieve values from the database for the measure(s) other than the counting measures. The query software instructions then retrieves data from the database 520 for the query at step 518. For each member in the query, the counting measure tree 515 is searched in step 522 to determine the distinct count value, and the method ends at step 524.

Three example queries are described below with reference to FIGS. 11-33. FIG. 11 depicts an example set of data that may be included in a hierarchical database. The example data shown in FIG. 11 is used for each of the three example queries. FIGS. 12-17 illustrate a first example database query that includes a single counting measure. FIGS. 18-27 illustrate a second example database query with two counting measures and one standard measure. FIGS. 28-33 illustrate a third example query with a counting measure associated with a global named set.

With reference first to FIG. 11, the illustrated data may be used to build an example hierarchical database, such as an OLAP cube. For the purposes of the examples set forth below, the name of the database that includes the data depicted in FIG. 11 is "mddbcars." The example data relates to the sale of automobiles to three different car dealers (Finch, Jones and Smith). During creation of the hierarchical database, the data is organized into levels, which in this example include a dealer level, a destination level (indicating the shipment destination of the automobiles), a date level, a car level (indicating the make of the automobile), and a color level. Measures may also be defined during database creation, including one or more counting measures. Also included in this example is a sales measure. Following are three examples of software instructions for defining counting measures for the example database structure of FIG. 11.

EXAMPLE MEASURE 1

Measure nu_car
    Stat=nunique
    level=car

In the first example, the members of the "car" level are associated with the counting (nunique) measure "nu_car."

EXAMPLE MEASURE 2

Measure dealer
    stat=nunique

In the second example, the members of the "dealer" level are associated with the counting (nunique) measure "dealer." The members of a level may be assigned to a counting measure without the use of a "level=" parameter by naming the measure the same as the associated level (e.g., dealer).

EXAMPLE MEASURE 3

Create global set [mddbcars].[usacars] as '{
   [cars].[all cars].[Chevy],
   [cars].[all cars].[Chrysler],
   [cars].[all cars].[Ford]}'
Measure nu_usacar
   stat=nunique
   set=usacars In the third example, the members of a global named set "usacars" are associated with the counting (nunique) measure "nu_usacar." The usacars global set is defined to include only the American made cars (Chevy, Chrysler and Ford) in the database.

With reference now to FIGS. 12-17, a first example query is described that returns distinct count values for the example "nu_car" counting measure described above. An example MDX query that may be used to return distinct count values for the "nu_car" measure (see Example Measure 1 above) is as follows.
   select
      date.members on columns,
      ([Dealers].[All Dealers].[Smith],
      [Dealers].[All Dealers].[Smith].children}
   on rows
   from mddbcars
   where measures.nu_car In the example query set forth above, the data members on the column are crossed with the Smith dealer and its children on the row. The slicer is the counting measure "nu_car," which will return a distinct count of the cars for these cells.

When the above query is executed, an initial query data structure is created to gather the data for the query, as illustrated in FIG. 12. In this example, the query data structure includes all of the members from the date dimension, the Smith dealers and its children, and the nu_car counting measure. Before the query data structure is passed to the software that queries the database, it is analyzed to determine if it contains a counting measure, and the measure "measure.nu_car" is flagged to indicate that additional computation is necessary.

Figure 13:
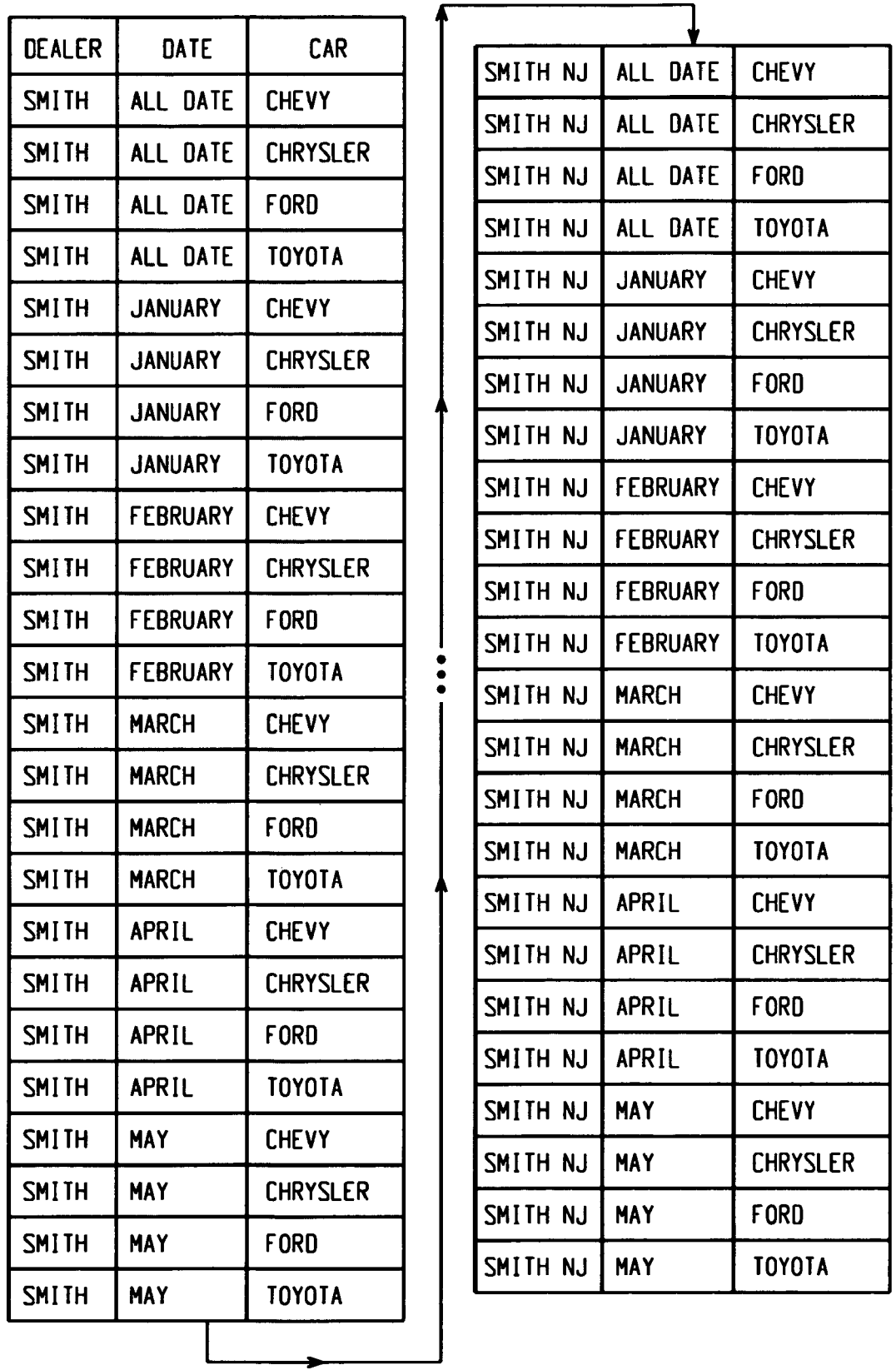

Upon identifying the counting measure, counting measure software instructions are executed to create a query data structure. To generate the query data structure, the initial query data structure (e.g., FIG. 12) is copied, and the actual measure (nu_car) is replaced with all of the members from the level associated with the counting measure. In this example, the nu_car measure in the initial query is replaced in the query data structure with all of the members of the car level (Chevy, Ford, Chrylser and Toyota), as illustrated in FIG. 13.

Once created, the query data structure may be passed to the software that queries the database to get the corresponding data from the hierarchical database. The results of the query are then returned and stored in a temporary data structure (e.g., a buffer). The temporary data structure created for the first example query is depicted in the table shown in FIG. 14.

As illustrated in FIG. 14, the temporary data structure may include duplicate entries for one or more members. For instance, FIG. 14 shows four duplicate entries for the row Smith-All Date-Ford. To remove the duplicate entries, each single instance of the rows of data in the temporary data structure may be stored in a reduced temporary data structure (e.g., a temporary tree), as illustrated in FIG. 15. In this example, the key for the reduced temporary data structure includes three parts—one part for each dimension that is in the data buffer. As illustrated, neither the temporary data structure (FIG. 14) nor the reduced temporary data structure (FIG. 15) require data values from the hierarchical database. Rather, they include members that are used as keys for calculating the distinct count value.

The distinct count values are calculated by iterating through the members in the reduced temporary data structure to accumulate the distinct count value in another temporary data structure, referred to herein as a counting measure tree. In this example, the dealer and date dimensions are stored as the key for the counting measure (the car dimension is not used as a key because this is the level that is being counted for the counting measure). The first time that a key is added, the distinct count value (nu_car) for the key is set to 1. As subsequent hits are made to the node, the distinct count value (nu_car) is incremented. FIG. 16 depicts the resulting distinct count values (nu_car value) that are recorded in the counting measure tree after looping through the reduced temporary data structure shown in FIG. 15.

During this iterative process, the members used as keys for the counting measure tree are mapped to a cell and the distinct count value is stored in a final accumulator. If there are cells that do not match with keys that are stored in the counting measure tree, then the accumulator value is set to empty for these cells. Persons skilled in the art will appreciate that this is different from a traditional distinctcount function, which would display a zero for empty crossings. However, because measures return an empty value for empty crossings, the NON EMPTY axis designation may be used to remove these tuples from the final set. The final results of the first example query are shown in FIG. 17.

With reference to FIGS. 18-27, a second example query is described that includes two counting measures and one standard measure. The following MDX query may be used to return distinct count values for the example "nu_car" and "dealer" counting measures described above (Example Measure 1 and Example Measure 2) and to return values for a standard "sales_n" measure.
   select
      date.members on columns,
      ([Measures].[Dealer], [Measures],[nu_car],
      [Measures].[sales_n] on rows
   from mddbcars When the above query is executed, the measures associated with the counting measure statistic are flagged and an initial query data structure is created, as illustrated in FIG. 18. In this example, the query data structure will contain all the members from the date dimension and the three measures, dealer, nu_car and sales_n.

For each identified counting measure in the query, a separate query data structure is created and a unique query is executed. In this example, the first query data structure will contain the date members and the members from the dealer level of the dealers dimension, and the second query data structure will contain the members from the date dimension and the members of the cars level of the cars dimension.

To generate the first query data structure, the rows of the initial query data structure (FIG. 18) relating to the dealer measure are copied, and the actual measure is replaced with all of the members from the associated dealer level (Finch, Jones and Smith), as illustrated in FIG. 19. The first query data structure may then be passed to the software that queries the database to get the corresponding data from the hierarchical database. The results of the query are stored in a temporary data structure (e.g., a buffer), as illustrated in FIG. 20.

Figure 20:
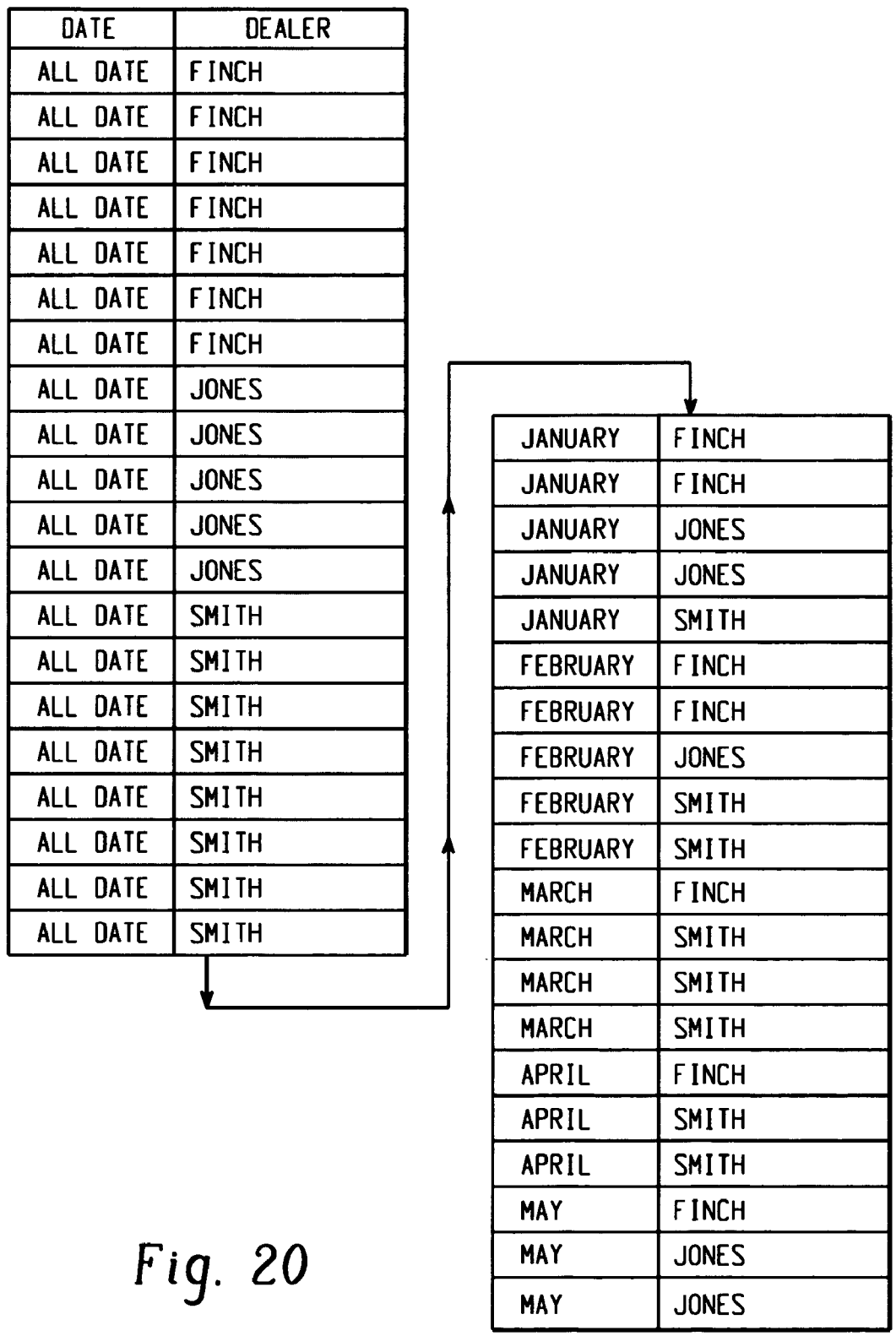

As illustrated in FIG. 20, the temporary data structure for the first query may include duplicate entries. To remove the duplicates, each single instance of the rows of data in the temporary data structure may be stored in a reduced temporary data structure (e.g., a temporary tree), as illustrated in FIG. 21. In this example, there are two parts to the key for the reduced temporary data structure: a first part for the date dimension members and a second part for the dealer dimension that is being counted for the dealer measure.

The distinct count values are calculated by iterating through the reduced temporary data structure to accumulate the distinct count value in a counting measure tree. In this example, only the date dimension members are stored as the key for the counting measure tree (the dealer dimension is not used because it is the level that is being counted). For each node in the temporary tree, if it is new to the counting measure tree, then the key is added and the value for the dealer is initialized to 1 and the value for nu_car is initialized to 0. If a node has already been added, then the dealer value is incremented. After the reduced temporary data structure has been completely read, the counting measure tree will contain all of the distinct count values for the dealer counting measure, as illustrated in FIG. 22.

To generate the second query data structure, the rows of the initial query data structure (FIG. 18) relating to the nu_car measure are copied, and the actual nu_car measure is replaced with all of the members from the associated car level (Chevy, Chrysler, Ford and Toyota), as illustrated in FIG. 23. The second query data structure may then be passed to the software that queries the database to get the corresponding data from the hierarchical database. The results of the second query are stored in a temporary data structure (e.g., a buffer), as illustrated in FIG. 24.

Figure 24:
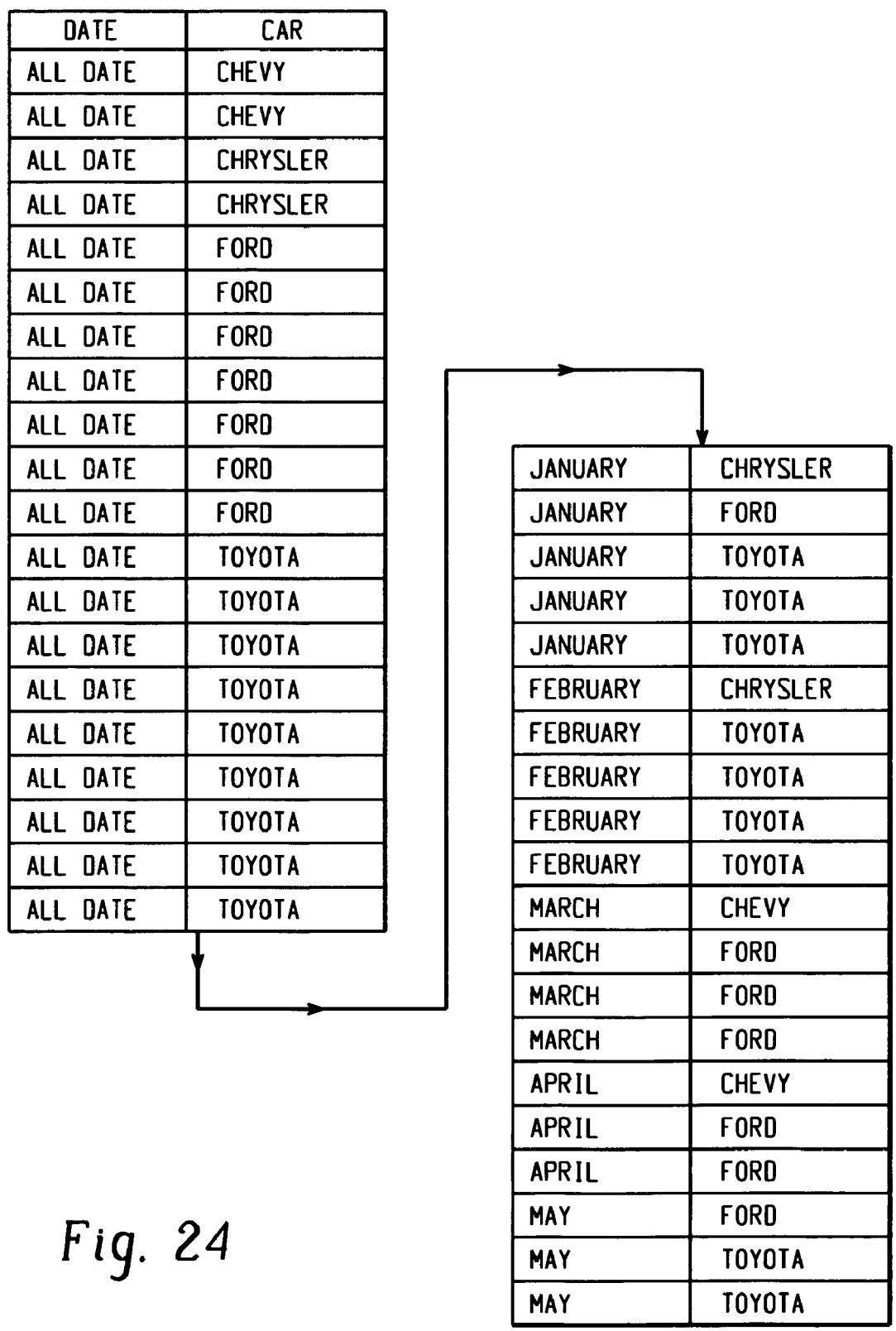

As illustrated in FIG. 24, the temporary data structure for the second query may include duplicate entries. To remove the duplicates, each single instance of the rows of data in the temporary data structure may be stored in a reduced temporary data structure (e.g., a temporary tree), as illustrated in FIG. 25. In this example, there are two parts to the key for the reduced temporary data structure: a first part for the date dimension members and a second part for the car level that is being counted for the nu_car measure.

The distinct count values are calculated by iterating through the reduced temporary data structure, using the date part of the key as the key in the counting measure tree that was created for the first query. The first time that a date is encountered, the nu_car value is set to 1, and each additional time the same date is encountered, the nu_car value is incremented. FIG. 26 shows the example counting measure tree after both queries have been completed, which includes the distinct count values for both of the counting measures included in the query.

Because the second example query also includes a standard measure (sales_n), a third query is performed to return the actual value associated with the sales_n measure. Each cell in a final table may then be filled in. If the cell is for a counting measure, then the value in the final table may be extracted from the counting measure tree (e.g., FIG. 26). If the cell is for the standard measure, then the value may be retrieved from the data buffer for the third query. The values from the third query and from the counting measure tree may be stored in a final accumulator, as illustrated in FIG. 27.

With reference to FIGS. 28-33, a third example query is described that includes a counting measure that is based on a global named set, instead of the members of a level. The following MDX query may be used to return distinct count values for a the counting measure nu_usacars described above (Example Measure 3), which is based on the usacars global named set.

select
  date.members on columns,
  ([Dealers].[All Dealers].[Smith],
  [Dealers].[All Dealers].[Smith].children }
  on rows
 from mddbcars
 where measures.nu_usacar In the example query set forth above, the data members on the column are crossed with the Smith dealer and its children on the row. The slicer is the counting measure "nu_usacar," which will return a distinct count of the American made cars for these cells.

When the above query is executed, the measures associated with the counting measure statistic are flagged and an initial query data structure is created. In this example, the initial query data structure will contain all the members from the date dimension, the Smith dealers and its children and the nu_usacar measure, as illustrated in FIG. 28. Before the query data structure is passed to the software that queries the database, it is analyzed to determine if it includes a counting measure. In this example, the measure nu_usacar is flagged, indicating that further processing is necessary.

Upon identifying the counting measure, counting measure software instructions are executed to create a query data structure. To generate the query data structure, the initial query data structure (FIG. 28) is copied, and the actual measure (nu_usacar) is replaced with all of the members from the global named set associated with the counting measure. In this example, the nu_usacar measure in the initial query is replaced in the query data structure with all of the members of the "usacars" global named set (Chevy, Chrysler and Ford), as illustrated in FIG. 29.

Once created, the query data structure may be passed to the software that queries the database to get the corresponding data from the hierarchical database. The results of the query are then returned and stored in a temporary data structure (e.g., a buffer), as illustrated in FIG. 30.

As illustrated in FIG. 30, the temporary data structure may include duplicate entries for one or more members. To remove the duplicate entries, each single instance of the data crossing in the temporary data structure may be stored in a reduced temporary data structure (e.g., a temporary tree), as illustrated in FIG. 31. In this example, there are three parts to the key for the reduced temporary data structure: a first part for the date dimension members, a second part for the dealer dimension for Smith and its children, and a third part for the car dimension that is being counted for the nu_usacar measure.

The distinct count values are calculated by iterating through the reduced temporary data structure to accumulate the distinct count value in a counting measure tree, with only the dealer and date dimension members being stored as the key for the counting measure tree in this example (the car dimension is not used because it is the level that is being counted). The first time a key is added, the nu_usacar value for the key is set to 1. As subsequent hits are made to the node, the nu_usacar value is incremented. After the reduced temporary data structure has been completely read, the counting measure tree will contain all of the distinct count values for the usacar counting measure, as illustrated in FIG. 32. The final results for the third example query are shown in FIG. 33.

Figure 34:
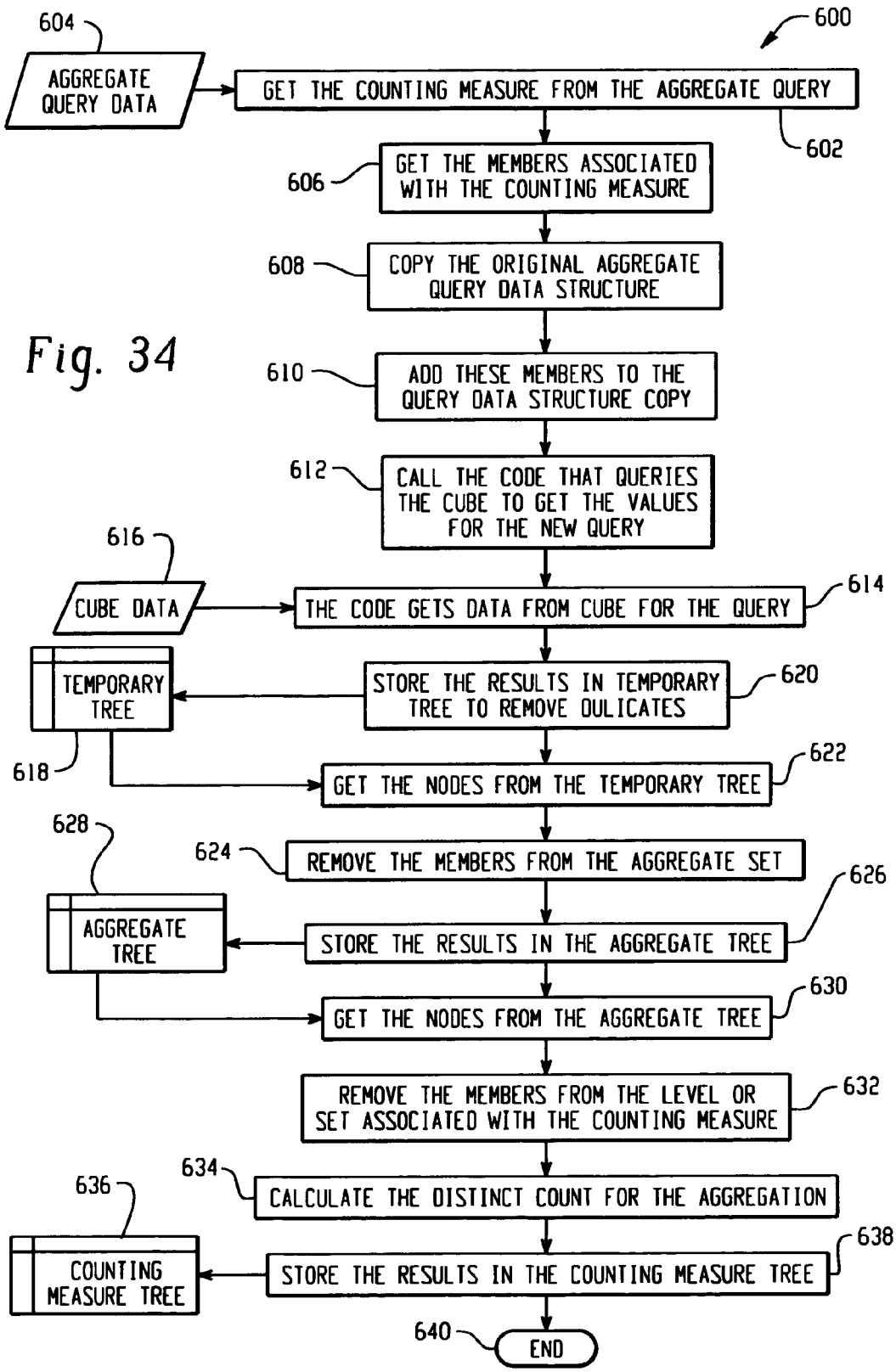
FIG. 34 is a flow diagram depicting an example method for processing a database query that includes one or more counting measures within an aggregate function.

FIG. 34 is a flow diagram depicting an example method 600 for processing a database query that includes one or more counting measures within an aggregate function. When an aggregate function is received in a database query, an initial query is called to process the aggregate function. The software instructions performing the aggregate function query may be configured to identify a counting measure within the aggregate function. Upon identifying the counting measure, further processing may be performed, for example by counting measure software instructions, to calculate one or more distinct counting values, as illustrated in FIG. 34.

At step 602, the counting measure is retrieved from the aggregate query data 604, and a query is executed. At step 606, all of the members associated with the counting measure are identified from the measure definition. The data from the original query data structure is copied into the query data structure at step 608, and all of the members associated with the counting measure are added to the query data structure in step 610. The database 616 is then queried at steps 612 and 614 to retrieve the data members, and the results are stored in a temporary data structure 618 (e.g., a temporary tree) at step 620 to remove any duplicate rows.

The members stored in the temporary tree 618 are iterated through at steps 622, 624 and 626 to remove members of the set being aggregated from the key and to create an aggregate data structure (e.g., tree) 628. The aggregate data structure 628 includes the original members in the query and the members that are associated with the counting measure minus those members from the aggregate set.

A distinct count value(s) for the counting measure is determined at steps 630, 632 and 634 by iterating through each node of the aggregate tree 628. In step 630, each node of the aggregate tree 628 is read, and the members from the level or set associated with the counting measure are removed from the node key at step 632 and the new member is stored into a counting measure tree 636 at step 638. At step 634, the distinct count value is calculated by setting the distinct count value to one the first time that a member is added to the counting measure tree, and then incrementing the distinct count value each additional time that the member is removed from the node key. Once all of the nodes in the aggregate tree 628 have been processed, the method ends at step 640.

An example query that includes a counting measure within an aggregate function is described below with reference to FIG. 11 and FIGS. 35-41. Using the example database "mddbcars" depicted in FIG. 11, following is an example query that includes a counting measure within an aggregate function.

with
   member dealers.total as '
      aggregate ([dealers].[dealer].members)'
select
   dealers.total on columns,
   date.members on rows
from mddbcars
where [meaures].[nu_car]

When the above query is executed, the software instructions identify that the query includes the counting measure "measures.nu_car," and also identify that the query includes an aggregate function. An initial query data structure is then created to gather the data for the aggregate query, as illustrated in FIG. 35. In this example, the query data structure will include the members from the dealer level (because that is what is being aggregated) and the date members, along with the nu_car measure. Before the query data structure is passed to the software that queries the database, it is analyzed to determine if it contains a counting measure and if it is associated with the aggregate function.

Upon identifying the counting measure in the aggregate query, counting measure software instructions are executed to create a query data structure. To generate the query data structure, the original query data structure (FIG. 35 is copied, all of the members from the level or set associated with the counting measure are added to the query data structure, and the actual counting measure (nu_car) is removed from the data structure. In this example, the nu_car measure in the initial query is replaced in the query data structure with all of the members of the car level (Chevy, Chrysler, Ford and Toyota), as illustrated in FIG. 36.

Once created, the query data structure is passed to the software that queries the database to retrieve the corresponding data from the hierarchical database. The results of the query are then returned and stored in a temporary data structure (e.g., a buffer), as illustrated in FIG. 37. As shown in FIG. 37, the temporary data structure may include one or more duplicate entries. To remove the duplicate entries, each single instance of the rows of data in the temporary data structure may be stored in a reduced temporary data structure (e.g., a temporary tree), as illustrated in FIG. 38. In this example, there are three parts to the key for the reduced temporary data structure: a first part from the dealer level, a second part from the date dimension, and a third part from the car level.

After creating the reduced temporary data structure, the members that are being aggregated are identified. The members in the reduced temporary data structure are then iterated through to remove the dealer level members from the key and store them as new nodes in the aggregate tree, as illustrated in FIG. 39.

The aggregate tree is then iterated through to generate the counting measure tree by removing the part of the key associated with the counting measure. The first time that a key is added, the value for the counting measure is set to 1. Subsequent times the key is added, the counting measure is incremented. In this example, the car portion of the key is removed, leaving only the date members in the key. The nu_car value in the counting measure tree holds the aggregate value for the nu_car counting measure based on the function from the query, as illustrated in FIG. 40. The nodes from the counting measure tree may then be mapped to cells and the final results returned, as illustrated in FIG. 41.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for calculating a distinct count value from data stored in a hierarchical database, a counting measure being defined in the hierarchical database such that the counting measure is associated with members of a category of data to be stored in the hierarchical database, the method comprising:

receiving a query that identifies a first counting measure and a second counting measure, the first counting measure and the second counting measure being defined at creation of the hierarchical database, the first counting measure being a function configured to return a distinct count value of a particular first category of data in the hierarchical database, the second counting measure being a function configured to return a distinct count value of a particular second category of data in the hierarchical database;

querying the hierarchical database to identify members of the first category of data and members of the second category of data that are stored in the hierarchical database;

retrieving the identified members of the first category of data and members of the second category of data from the hierarchical database and generating a temporary data structure to store the members of the first category of data and the members of the second category of data retrieved from the hierarchical database; and using the temporary data structure to calculate one or more distinct count values for the members of the first category of data and the members of the second category of data that are stored in the hierarchical database.

2. The computer-implemented method of claim 1, wherein the received query also identifies one or more additional categories of data stored in the hierarchical database, and wherein the temporary data structure includes a plurality of rows of data that relate members of the first category of data and members of the second category of data with members of the one or more additional categories of data.

3. The method of claim 2, further comprising:

generating a query data structure that identifies the one or more additional categories of data and identifies all members of the first category of data associated with the first counting measure and all members of the second category of data associated with the second counting measure;

the query data structure being used to query the hierarchical database to identify members of the first category of data and members of the second category of data that are stored in the hierarchical database.

4. The method of claim 2, wherein the first category of data and the second category of data are each a level of the hierarchical database or a global named set of data, and wherein the one or more additional categories of data are members of the hierarchical database.

5. The computer-implemented method of claim 1, wherein the hierarchical database is queried only a single time for each counting measure included in the received query.

6. The computer-implemented method of claim 1, wherein the step of querying the hierarchical database includes querying a database cache.

7. The computer-implemented method of claim 1, further comprising:

removing duplicate rows of data from the temporary data structure to generate a reduced data structure;

wherein the one or more distinct count values are calculated using the reduced data structure.

8. The computer-implemented method of claim 7, wherein the query identifies one or more additional counting measures that are defined in the hierarchical database, and wherein for each of the additional counting measures identified in the query performing steps further comprising:

querying the hierarchical database to identify members of a category of data associated with the additional counting measure that are stored in the hierarchical database;

generating an additional data structure that includes the members of the category of data associated with the additional counting measure that are stored in the hierarchical database;

removing duplicate rows of data from the additional data structure to generate a reduced additional data structure; and calculating one or more distinct count values for the members of the category of data associated with the additional counting measure that are stored in the hierarchical database using the reduced additional data structure.

9. The computer-implemented method of claim 7, wherein the one or more distinct count values are calculated using a method further comprising:

reading members of the first category of data and members of the second category of data from the reduced data structure;

setting a distinct count value for a particular member to one the first time that the particular member is read from the reduced data structure; and incrementing the distinct count value for the particular member each additional time that the particular member is read from the reduced data structure.

10. The computer-implemented method of claim 9, wherein the members of the first category of data and the members of the second category of data are read from the reduced data structure by removing the members from a node key of the reduced data structure and adding the members to a counting measure tree.

11. The computer-implemented method of claim 7, wherein the query identifies an aggregate function that includes the counting measure, and wherein the aggregate function identifies an additional category of data to be aggregated, using the method further comprising:
   removing members of the identified additional category of data from the reduced data structure and removing duplicate rows of data to generate an aggregate data structure; and
   calculating the one or more distinct count values using the aggregate data structure.

12. The computer-implemented method of claim 1, wherein the hierarchical database is an Online Analytical Processing (OLAP) database.

13. The method of claim 1, wherein the first category of data is one level of the hierarchical database.

14. The method of claim 1, wherein the query also identifies a a third counting measure associated with a third category of data;
   the method further comprising:
      querying the hierarchical database to identify members of the third category of data that are stored in the hierarchical database;
      retrieving the identified members of the third category of data from the hierarchical database and generating a third temporary data structure to store the members of the third category of data retrieved from the hierarchical database; and
      using the third temporary data structure to calculate one or more distinct count values for the members of the third category of data that are stored in the hierarchical databases wherein steps for the first category data, second category data, and third category data are executed in parallel.

15. A computer-readable medium having stored software instructions for calculating a distinct count value from data stored in a hierarchical database, a counting measure being defined in the hierarchical database such that the counting measure is associated with members of a category of data to be stored in the hierarchical database, the software instructions when executed by a computer implementing a method comprising:
   receiving a query that identifies a first counting measure, a second counting measure, and one or more additional categories of data stored in the hierarchical database, the first counting measure and the second counting measure being defined at creation of the hierarchical database, the first counting measure being a function configured to return a distinct count value of a particular first category of data in the hierarchical database, the second counting measure being a function configured to return a distinct count value of a particular second category of data in the hierarchical database;
   querying the hierarchical database to identify members of the first category of data and members of the second category of data that are presently in the hierarchical database;
   retrieving the identified members of the first category of data and members of the second category of data from the hierarchical database and generating a temporary data structure to store the members of the first category of data and the members of the second category of data retrieved from the temporary data structure with members of one or more additional categories of data included in the temporary data structure; and
   using the temporary data structure to calculate one or more distinct count values for the members of the first category of data and the members of the second category of data.

16. The computer-readable medium of claim 15, the method implemented by the software instructions further comprising:
   removing duplicate rows of data from the temporary data structure to generate a reduced data structure;
   wherein the one or more distinct count values are calculated using the reduced data structure.

17. The computer-readable medium of claim 16, wherein the software instructions are further configured to read members of the first category of data and members of the second category of data from the reduced data structure, set a distinct count value for a particular member to one the first time that the particular member is read from the reduced data structure, and increment the distinct count value for the particular member each additional time that the particular member is read from the reduced data structure.

18. The computer-readable medium of claim 17, wherein the members of the first category of data and members of the second category of data are read from the reduced data structure by removing the members from a node key of the reduced data structure and adding the members to a counting measure tree.

19. The computer-readable medium of claim 16, wherein the query identifies an aggregate function that includes the counting measure, and wherein the aggregate function identifies an additional category of data to be aggregated, using the method implemented by software instructions further comprising:
   removing members of the identified additional category of data from the reduced data structure and remove duplicate rows of data to generate an aggregate data structure; and
   calculating the one or more distinct count values using the aggregate data structure.

20. The computer-readable medium of claim 15, the method implemented by the software instructions further comprising:
   generating a second data structure that identifies the one or more additional categories of data and identifies all members of the first category of data associated with the first counting measure and all members of the second category of data associated with the second counting measure;
   the second data structure being used to query the hierarchical database to identify members of the first category of data and members of the second category of data that are stored in the hierarchical database.

21. The computer-readable medium of claim 15, wherein the first category of data and the second category of data are each a level of the hierarchical database or a global named set of data, and wherein the one or more additional categories of data are levels of the hierarchical database.

22. The computer-readable medium of claim 15, wherein the hierarchical database is an Online Analytical Processing (OLAP) database.

23. A computer-implemented system for calculating a distinct count value from data stored in a hierarchical database, the system comprising:
   one or more processors;

one or more computer-readable storage mediums containing instructions operable to cause the one or more processors to perform operations including:

receiving a query that identifies a first counting measure and a second counting measure, the first counting measure and the second counting measure being defined at the creation of the hierarchical database such that each counting measure is associated with members of a category of data to be stored in the hierarchical database, the first counting measure being a function configured to return a distinct count value of a particular first category of data in the hierarchical database, the second counting measure being a function configured to return a distinct count value of a particular second category of data in the hierarchical database;

querying the hierarchical database to identify members of the first category of data and members of the second category of data that are stored in the hierarchical database;

retrieving the identified members of the first category of data and members of the second category of data from the hierarchical database and generating a temporary data structure in a computer-readable medium to store the members of the first category of data and the members of the second category of data retrieved from the hierarchical database; and using the temporary data structure to calculate one or more distinct count values for the members of the first category of data and the members of the second category of data that are stored in the hierarchical database.

24. A computer-implemented method for calculating a distinct count value from data stored in a hierarchical database, a plurality of counting measures being defined in the hierarchical database such that each counting measure is associated with members of a category of data to be stored in the hierarchical database, the method comprising:

receiving a query that identifies the plurality of counting measures, each counting measure being defined at creation of the hierarchical database, each counting measure being a function configured to return a distinct count value of a particular category of data in the hierarchical database;

querying the hierarchical database to identify members of a category of data that is stored in the hierarchical database, wherein the hierarchical database is queried only a single time for each counting measure included in the received query;

retrieving the identified members of the category of data from the hierarchical database and generating a temporary data structure in a computer-readable medium to store the members of the category of data retrieved from the hierarchical database; and using the temporary data structure to calculate one or more distinct count values for the members of the category of data that are stored in the hierarchical database.

25. A computer-implemented method for calculating a distinct count value from data stored in a hierarchical database, the method comprising:

receiving a query that identifies an aggregate function that includes a counting measure defined at the creation of the hierarchical database and associated with members of a category of data stored in the hierarchical database, the counting measure being a function configured to return a distinct count value of a particular first category of data in the hierarchical database;

querying the hierarchical database to identify members of the first category of data that are stored in the hierarchical database;

retrieving the identified members of the first category of data from the hierarchical database and generating a temporary data structure to store the retrieved members of the first category of data;

removing duplicate rows of data from the temporary data structure to generate a reduced data structure;

using the aggregate function to identify an additional category of data, wherein members of the identified additional category of data are removed from the reduced data structure to generate an aggregate data structure; and using the aggregate data structure to calculate one or more distinct count values for the retrieved members of the first category of data stored in the hierarchical database.

* * * * *

UNITED STATES PATENT AND TRADEMARK OFFICE
CERTIFICATE OF CORRECTION

PATENT NO. : 7,698,314 B2  Page 1 of 1
APPLICATION NO. : 11/270408
DATED : April 13, 2010
INVENTOR(S) : Croft et al.

It is certified that error appears in the above-identified patent and that said Letters Patent is hereby corrected as shown below:

In column 15, line 21, delete "a a" and insert --a--.

In column 15, line 35, delete "databases" and insert --database,--.

Signed and Sealed this

Fifteenth Day of June, 2010

David J. Kappos
*Director of the United States Patent and Trademark Office*